US009097955B2

(12) United States Patent
Takeda et al.

(10) Patent No.: US 9,097,955 B2
(45) Date of Patent: Aug. 4, 2015

(54) OPTICAL UNIT AND ITS MANUFACTURING METHOD

(75) Inventors: Tadashi Takeda, Nagano (JP); Kiyoshi Miyazaki, Nagano (JP); Katsushige Yanagisawa, Nagano (JP); Jun Yamashita, Nagano (JP); Hisahiro Ishihara, Nagano (JP)

(73) Assignee: NIDEC SANKYO CORPORATION (JP)

( * ) Notice: Subject to any disclaimer, the term of this patent is extended or adjusted under 35 U.S.C. 154(b) by 688 days.

(21) Appl. No.: 13/389,150

(22) PCT Filed: Aug. 4, 2010

(86) PCT No.: PCT/JP2010/063167
§ 371 (c)(1),
(2), (4) Date: Feb. 22, 2012

(87) PCT Pub. No.: WO2011/018967
PCT Pub. Date: Feb. 17, 2011

(65) Prior Publication Data
US 2012/0140326 A1 Jun. 7, 2012

(30) Foreign Application Priority Data
Aug. 11, 2009 (JP) ................................. 2009-186342

(51) Int. Cl.
G02B 27/64 (2006.01)
G03B 5/00 (2006.01)
G02B 13/00 (2006.01)
H04N 5/225 (2006.01)
H04N 5/232 (2006.01)

(52) U.S. Cl.
CPC ................ *G03B 5/00* (2013.01); *G02B 13/001* (2013.01); *G02B 27/646* (2013.01); *H04N 5/2253* (2013.01); *H04N 5/2257* (2013.01); *H04N 5/23258* (2013.01); *H04N 5/23287* (2013.01); *Y10T 29/49826* (2015.01)

(58) Field of Classification Search
None
See application file for complete search history.

(56) References Cited

U.S. PATENT DOCUMENTS

2010/0091120 A1* 4/2010 Nagata et al. .............. 348/208.4
2011/0103782 A1* 5/2011 Tsuruta et al. .................. 396/55
(Continued)

FOREIGN PATENT DOCUMENTS

| JP | 2007-41418 A | 2/2007 |
|---|---|---|
| JP | 2007-41419 A | 2/2007 |
| JP | 2007-93953 A | 4/2007 |

(Continued)

OTHER PUBLICATIONS

International Search Report for International Application No. PCT/JP2010/063137 mailed Aug. 31, 2010, with English translation.

*Primary Examiner* — Derek S Chapel
(74) *Attorney, Agent, or Firm* — Cantor Colburn LLP

(57) ABSTRACT

Provided is an optical unit comprising a shake detecting sensor which is less likely to unnecessarily vibrate even with the optical unit being designed to have a thinner profile. At a first step in the assembly of an optical unit provided with a shake correction mechanism, a module cover is mounted on a fixed body with a spring member therebetween and a movable module driving mechanism is provided between the module cover and the fixed body. At a second step, an image-capturing unit is inserted into the interior of the module cover by way of a fixed-body-side opening portion and a module-cover-side opening portion, and at a third step, a holding member is attached to a module cover.

18 Claims, 10 Drawing Sheets

(56) References Cited

U.S. PATENT DOCUMENTS

2011/0262121 A1* 10/2011 Yanagisawa et al. ........... 396/55
2011/0262122 A1* 10/2011 Minamisawa et al. .......... 396/55

FOREIGN PATENT DOCUMENTS

| | | |
|---|---|---|
| JP | 2008-89805 A | 4/2008 |
| JP | 2008-191615 A | 8/2008 |

* cited by examiner

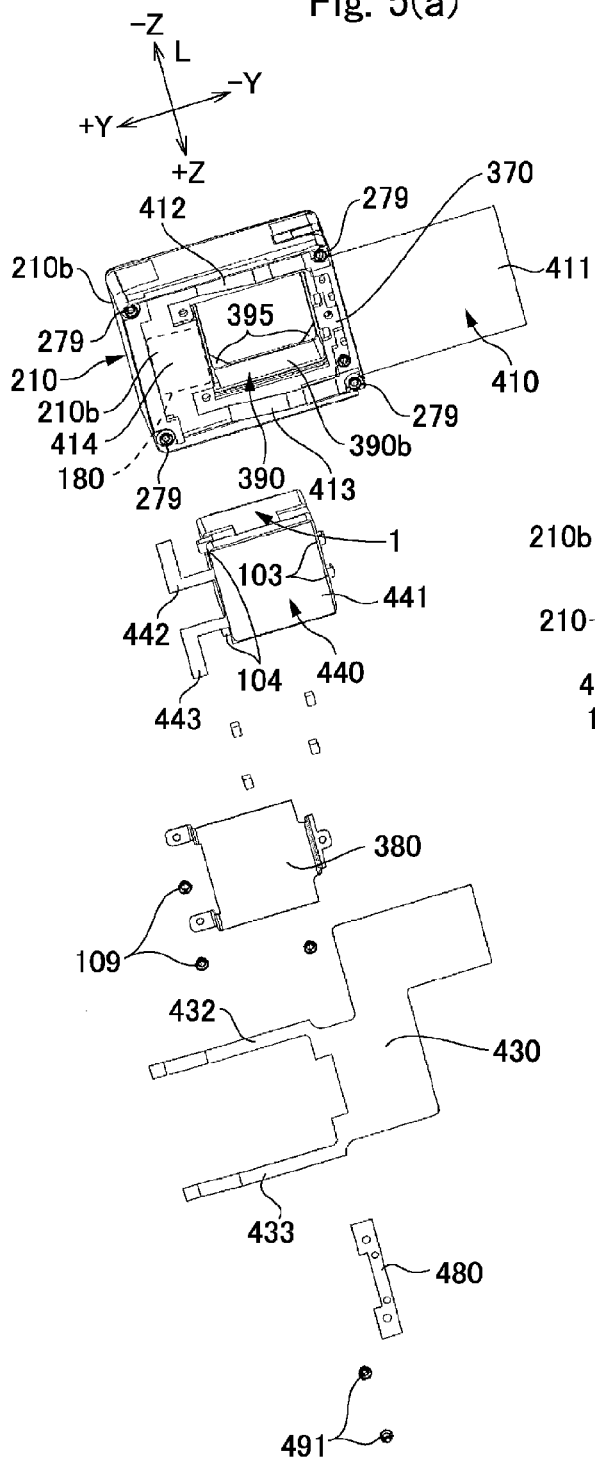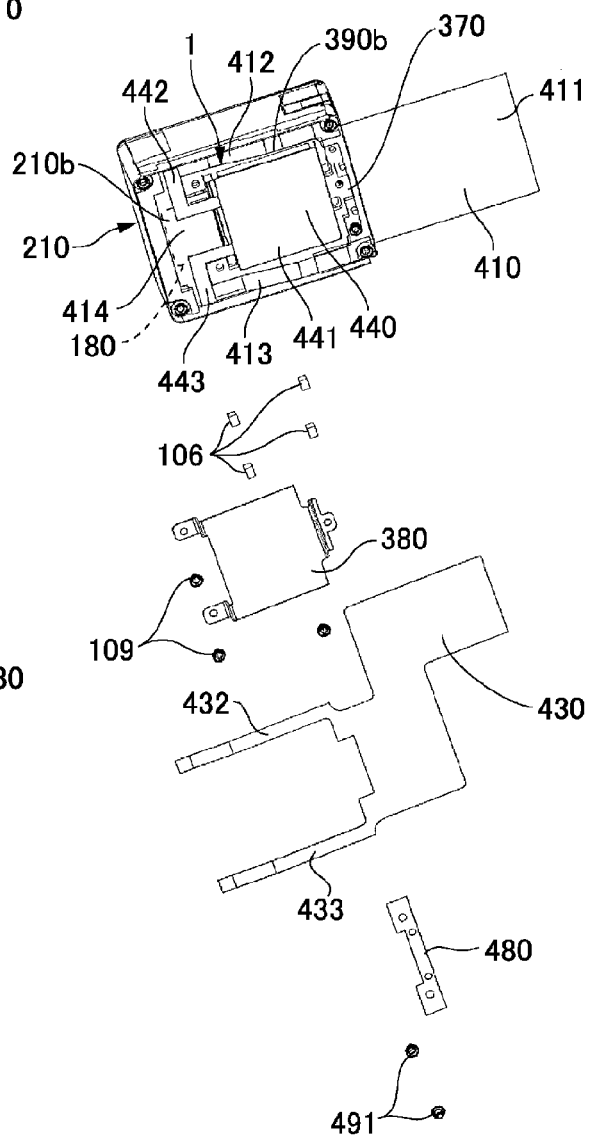

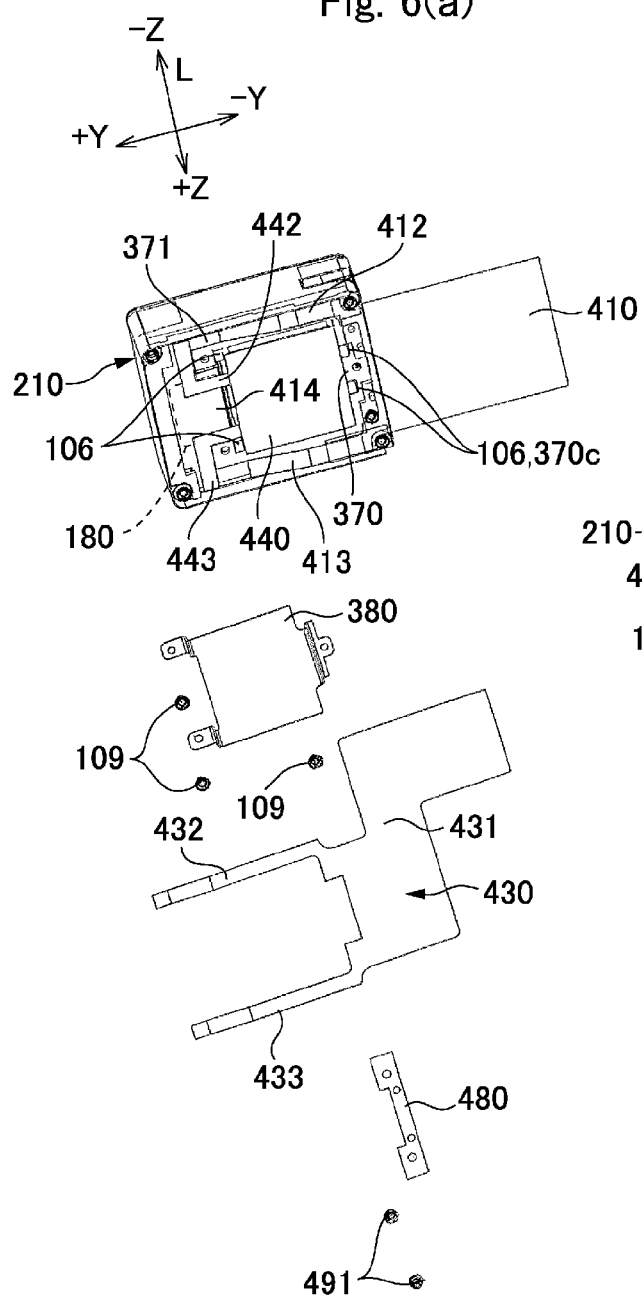
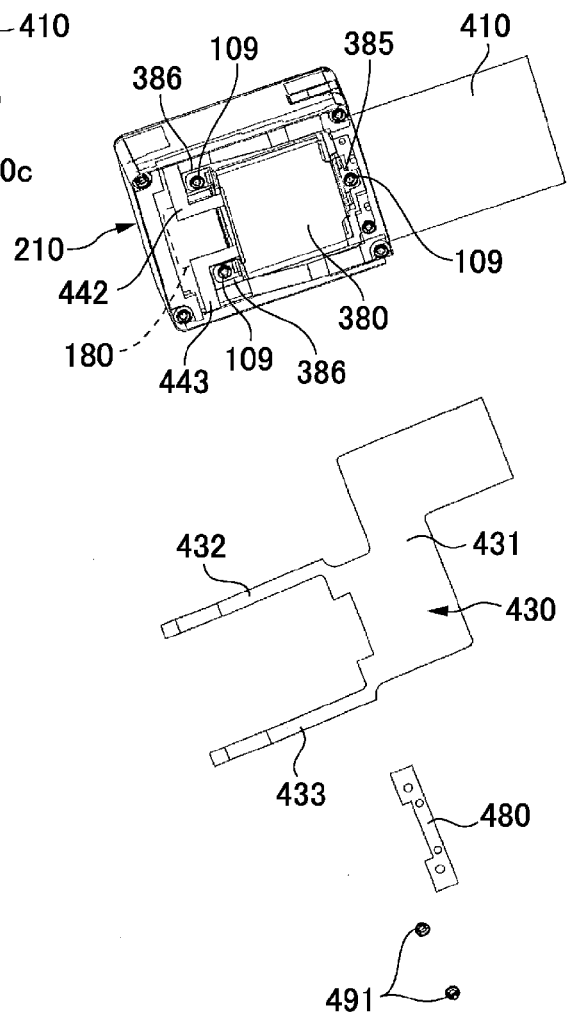

OPTICAL UNIT AND ITS MANUFACTURING METHOD

CROSS REFERENCE TO RELATED APPLICATIONS

This is a U.S. national stage of application No. PCT/JP2010/063167, filed on Apr. 8, 2010, 2010. Priority under 35 U.S.C. §119(a) and 35 U.S.C. §365(b) is claimed from Japanese Application No. 2009-186342, filed Aug. 11, 2009, the disclosure of which is also incorporated herein by reference.

TECHNICAL FIELD

The present invention relates to an optical unit which is mounted on a cell phone with a camera or the like and its manufacturing method.

BACKGROUND

In recent years, a cell phone is structured as an optical device on which an optical unit for photographing is mounted. In the optical unit for photographing, in order to prevent disturbance of a photographed image due to a hand shake of a user, it has been proposed that a movable module provided with an optical element such as a lens is supported so as to be capable of being displaced with respect to a fixed body by a spring member and a movable module drive mechanism for correcting the hand shake is structured between the movable module and the fixed body for swinging the movable module (see Patent Literature 1).

Further, in the optical unit described in Patent Literature 1, the movable module includes an optical element unit provided with a lens and the like and a module cover holding the optical element unit and the module cover is formed with an opening part larger the optical element unit. According to this structure, after the module cover is supported by the fixed body through the spring member, the optical element unit is accommodated in the inside of the module cover and, after that, the optical element unit can be fixed in the inside of the module cover by an adhesive or welding. Therefore, the optical element unit provided with a lens and the like can be manufactured in a separated step from another mechanism.

[PTL 1] Japanese Patent Laid-Open No. 2007-41418

However, in the structure in which, after the optical element unit has been accommodated in the inside of the module cover, the optical element unit is fixed in the inside of the module cover by an adhesive or welding, the optical element unit inserted into the module cover is required to be held until the adhesion or the welding has been completed and thus considerable time and labor are required for assembling. Further, when the optical element unit is to be fixed in the inside of the module cover, the optical axis may be displaced.

The above-mentioned problems are not limited to the optical unit for photographing provided with the shake correction mechanism but are common to a general optical module in which the movable module is supported by the fixed body so as to be capable of being displaced.

SUMMARY

In view of the problems described above, at least an embodiment of the present invention provides an optical unit which is easily assembled and in which displacement of an optical axis is hard to occur even when the optical element unit may be manufactured in a separate step from a step for another mechanism, and to provide a manufacturing method for the optical unit.

In order to solve the problem, at least an embodiment of the present invention provides an optical unit with a shake correcting function including a fixed body, a movable module which holds an optical element, a spring member through which the movable module is supported by the fixed body so as to be capable of displacing, a shake detection sensor which detects a shake of the movable module, and a movable module drive mechanism for a shake correction which is provided between the movable module and the fixed body and which generates a magnetic drive force for relatively displacing the movable module with respect to the fixed body so as to cancel the shake on the basis of a detection result of the shake detection sensor. In a case that one side in an optical axis direction is a first direction and the other side is a second direction, the fixed body is provided with a fixed body side opening part which is larger than an optical element unit on a first direction side. In addition, the movable module includes the optical element unit which holds the optical element, a module cover which is supported by the fixed body so as to be capable of displacing through the spring member and is provided with a module cover side opening part larger than the optical element unit at a position superposed on the fixed body side opening part on the first direction side, a support part which supports an end part on a second direction side of the optical element unit, and a pressing member which supports an end part on the first direction side of the optical element unit.

Further, at least an embodiment of the present invention provides a manufacturing method for an optical unit with a shake correcting function, the optical unit including a fixed body, a movable module which holds an optical element, a spring member through which the movable module is supported by the fixed body so as to be capable of displacing, a shake detection sensor which detects a shake of the movable module, and a movable module drive mechanism for a shake correction which is provided between the movable module and the fixed body and which generates a magnetic drive force for relatively displacing the movable module with respect to the fixed body so as to cancel the shake on the basis of a detection result of the shake detection sensor. The manufacturing method includes, in a case that one side in an optical axis direction is a first direction and the other side is a second direction, previously providing the fixed body with a fixed body side opening part which is larger than an optical element unit on a first direction side, previously providing the movable module with the optical element unit which holds the optical element, a module cover which is supported by the fixed body so as to be capable of displacing through the spring member and is provided with a module cover side opening part larger than the optical element unit at a position superposed on the fixed body side opening part on the first direction side, a support part which supports an end part on a second direction side of the optical element unit, and a pressing member which supports an end part on the first direction side of the optical element unit. In addition, the manufacturing method includes a first step in which the module cover and the support part are mounted on the fixed body through the spring member and the movable module drive mechanism is provided between the module cover and the fixed body, a second step in which the optical element unit is inserted to an inner side of the module cover through the fixed body side opening part and the module cover side opening part, and a third step in which the pressing member is connected with the module cover.

In at least an embodiment of the present invention, the fixed body is provided with a fixed body side opening part which is opened in a first direction and the module cover is also provided with a module cover side opening part on the first direction side. Therefore, the module cover is mounted on the fixed body through the spring member and the movable module drive mechanism is provided between the module cover and the fixed body and, after that, the optical element unit can be inserted to an inner side of the module cover through the fixed body side opening part and the module cover side opening part. Accordingly, the optical element unit can be manufactured in a separate step from a step in which the module cover, the spring member, the movable module drive mechanism are attached to the fixed body. Therefore, different from a case that inspection is performed after all the members have been assembled, inspection can be performed during manufacturing. As a result, a loss caused by a defective product can be restrained. Further, the support part is provided on the second direction side with respect to the module cover and the pressing member is provided on the first direction side. Therefore, when the optical element unit is inserted in the inside of the module cover, the end part on the second side of the optical element unit is supported by the support part. Further, after the pressing member is attached, the end part on the first direction side of the optical element unit is supported by the pressing member. Therefore, different from a structure in which, after the optical element unit is accommodated in the inside of the module cover, the optical element unit is fixed to the inside of the module cover by adhesion, welding or the like, assembling is easily performed and displacement of the optical axis is hard to be occurred. Accordingly, the production efficiency and yield of the optical unit can be improved. In addition, after the optical element unit is mounted, only the optical element unit can be exchanged and, when the optical unit is to be manufactured, the optical element unit to be mounted can be easily changed to another optical element unit.

In at least an embodiment of the present invention, it is preferable that the module cover is provided with a tube-like shape body part which surrounds the optical element unit and a support plate part which is protruded toward the module cover side opening part from an end part on a second direction side of the tube-like shape body part as the support part. According to this structure, even when the support part is not structured of a separate member, the end part on the second direction side of the optical element unit is supported.

In at least an embodiment of the present invention, it may be adopted that the module cover is provided with a tube-like shape body part which surrounds the optical element unit, and the support part is a support member which is a separate member from the module cover and is provided on a second direction side with respect to the tube-like shape body part.

In at least an embodiment of the present invention, for example, the second direction is a direction to which an optical axis is extended in the optical element unit, and the first direction is an opposite direction to the side to which the optical axis is extended in the optical element unit.

In this case, it is preferable that the shake detection sensor is provided at a position which is not superposed on the optical element unit in the optical axis direction. According to this structure, in the optical element unit, even when the shake detection sensor is provided on the opposite side to the side where the optical axis is extended, the optical element unit can be inserted to the inner side of the module cover through the fixed body side opening part and the module cover side opening part. Therefore, the shake detection sensor is not required to be provided at a position superposed on the optical element unit on the second direction side after the optical element unit has been inserted to the inner side of the module cover and thus, the optical unit can be made relatively thin.

In at least an embodiment of the present invention, it may be structured that the first direction is a direction to which an optical axis is extended in the optical element unit, and the second direction is an opposite direction to the side to which the optical axis is extended in the optical element unit.

In this case, it is preferable that a connector member which is electrically connected with the optical element unit is disposed between the end part on the second direction side of the optical element unit and the support part. According to this structure, electric connection can be performed easily at the end part on the second direction side of the optical element unit.

In at least an embodiment of the present invention, it may be adopted that the optical element unit holds an imaging element as the optical element. Further, in at least an embodiment of the present invention, it may be adopted that the optical element unit holds an optical element drive mechanism for driving the optical element in the optical axis direction.

In at least an embodiment of the present invention, the module cover is mounted on the fixed body through the spring member and the movable module drive mechanism is provided between the module cover and the fixed body and, after that, the optical element unit can be inserted to an inner side of the module cover through the fixed body side opening part and the module cover side opening part. Therefore, the optical element unit can be manufactured in a separate step from a step in which the module cover, the spring member, the movable module drive mechanism are attached to the fixed body. Accordingly, different from a case that inspection is performed after all the members have been assembled, inspection can be performed during manufacturing. As a result, a loss caused by a defective product can be restrained. Further, when the optical element unit is inserted in the inside of the module cover, the end part on the second side of the optical element unit is supported by the support part and, after the pressing member has been attached, the end part on the first direction side of the optical element unit is supported by the pressing member. Therefore, different from a structure in which, after the optical element unit is accommodated in the inside of the module cover, the optical element unit is fixed to the inside of the module cover by adhesion, welding or the like, assembling is easily performed and displacement of the optical axis and the like are hard to be occurred. Accordingly, the production efficiency and yield of the optical unit can be improved. In addition, after the optical element unit is mounted, only the optical element unit can be exchanged and, when the optical unit is to be manufactured, the optical element unit to be mounted can be easily changed to another optical element unit.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 5(a) and 5(b) are explanatory views showing a manufacturing method for the optical unit in accordance with the first embodiment of the present invention.

FIGS. 6(a) and 6(b) are explanatory views showing a manufacturing method for the optical unit in accordance with the first embodiment of the present invention.

DESCRIPTION OF EMBODIMENTS

Embodiments of the present invention will be described below with reference to the accompanying drawings. In the following descriptions, a structure for preventing a hand shake in a photographing unit will be described below as an example for an optical element unit. Further, in the following descriptions, three directions perpendicular to each other are set to be an X-axis, a Y-axis and a Z-axis, and a direction along an optical axis "L" (lens optical axis) is set to be the Z-axis. Therefore, in the following descriptions, a swing around the X-axis of shakes in the respective directions corresponds to a so-called pitching (vertical swing), a swing around the Y-axis corresponds to a so-called yawing (lateral swing), and a swing around the Z-axis corresponds to a so-called rolling. Further, "+X" is attached on one side in the X-axis, "−X" is attached on the other side, and "+Y" is attached on one side in the Y-axis, "−Y" is attached on the other side, and "+Z" is attached on one side (opposite side to an object side) in the Z-axis, and "−Z" is attached on the other side (object side).

First Embodiment

In this embodiment, after a module cover and the like have been mounted on a fixed body, a photographing unit (optical element unit) is inserted into a module cover from an opposite side to an object to be photographed (side to which an optical axis is extended). Therefore, in this embodiment, "first direction" and "second direction" are as follow:

First direction=an opposite direction to a side to which the optical axis is extended (opposite side to an object to be photographed).

Second direction=a direction to which the optical axis is extended (object side to be photographed).
(Entire Structure of Optical Device for Photographing)

Figure 1A:
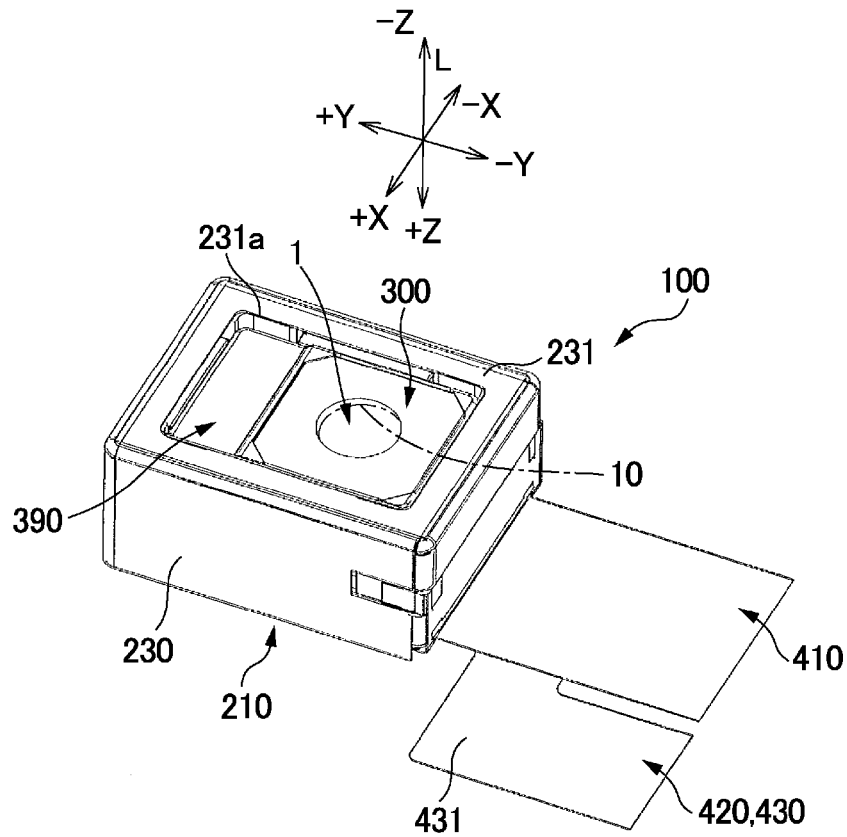
FIGS. 1(a) and 1(b) are explanatory views showing an optical unit for photographing in accordance with a first embodiment of the present invention.
Figure 1B:
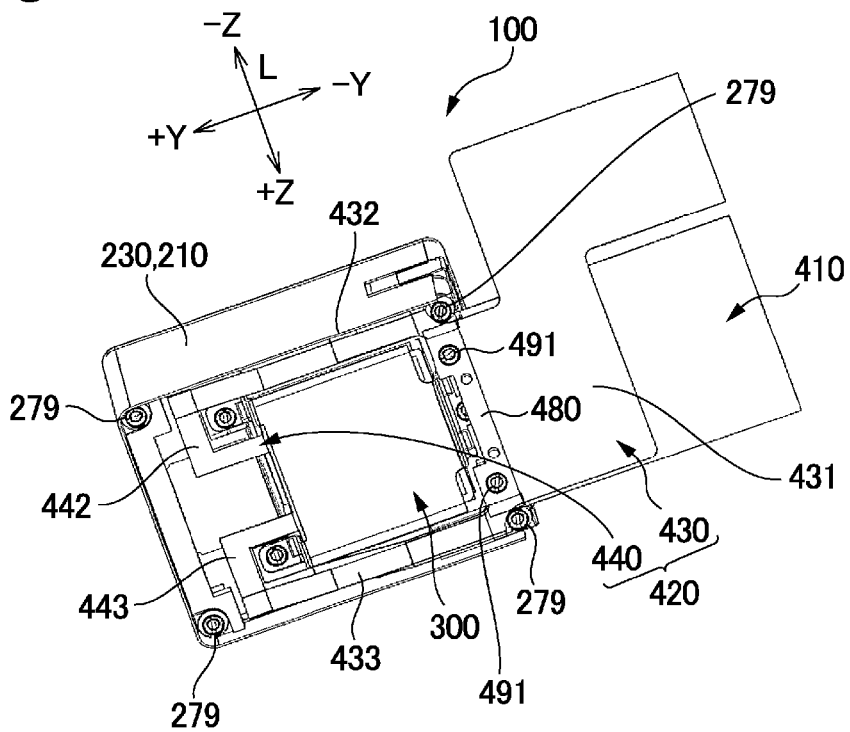
Figure 2A:
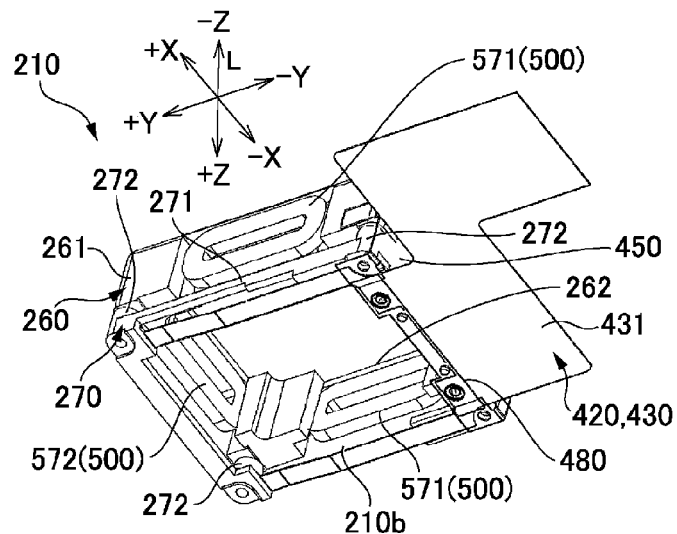
FIGS. 2(a), 2(b) and 2(c) are explanatory views showing a fixed body and a movable module of the optical unit in accordance with the first embodiment of the present invention.
Figure 2B:
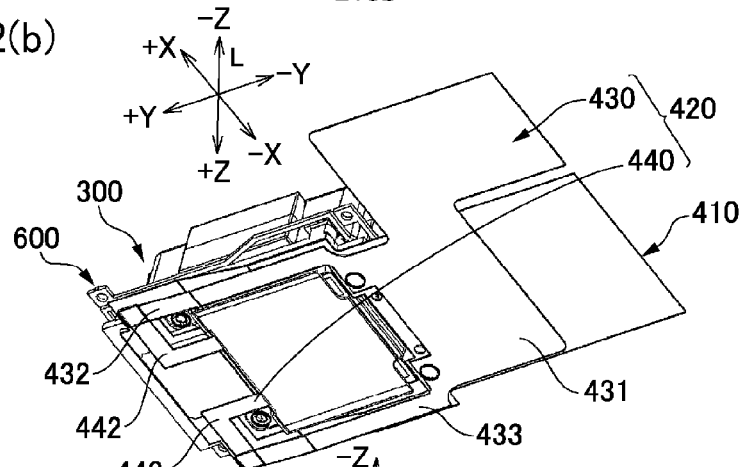
Figure 2C:
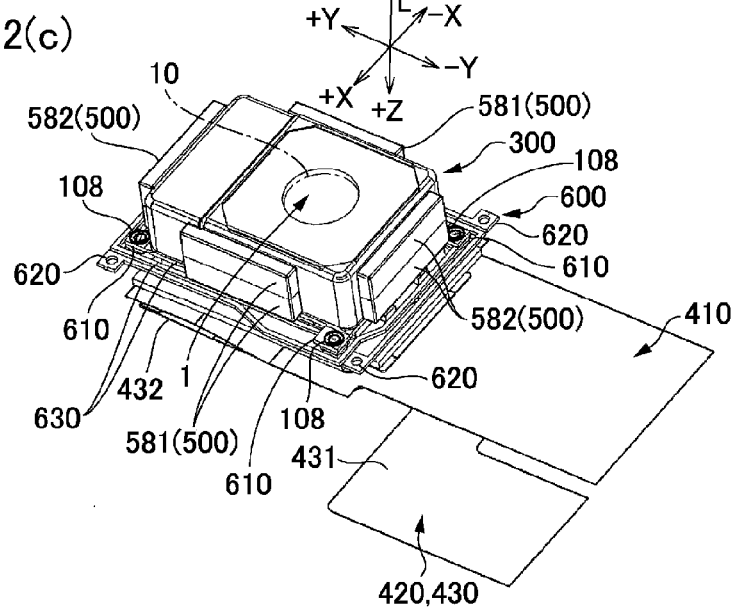

FIGS. 1(a) and 1(b) are explanatory views showing an optical unit for photographing in accordance with a first embodiment of the present invention. FIG. 1(a) is a perspective view showing the optical unit which is viewed from an object side and FIG. 1(b) is a perspective view showing the optical unit which is viewed from an opposite side to the object side. FIGS. 2(a), 2(b) and 2(c) are explanatory views showing a fixed body and a movable module of the optical unit in accordance with the first embodiment of the present invention. FIG. 2(a) is a perspective view showing a fixed body which is viewed from the opposite side to the object side, FIG. 2(b) is a perspective view showing a movable module which is viewed from the opposite side to the object side, and FIG. 2(c) is a perspective view showing the movable module which is viewed from the object side. In FIG. 2(a), a fixed cover is not shown.

An optical unit 100 (optical unit with shake correcting function/photographic optical device) shown in FIGS. 1(a) and 1(b) and FIGS. 2(a), 2(b) and 2(c) is a thin camera used in an optical device such as a cell phone with a camera. The optical unit 100 is formed in a roughly rectangular prism shape as a whole. The optical unit 100 is provided with a coil holding body 260, a frame 270 which is fixed to the coil holding body 260 on an opposite side ("+Z"-axis direction) to an object side ("−Z"-axis direction), and a box-shaped fixed cover 230 which holds the coil holding body 260 and the frame 270 in its inner side. The fixed body 210 is structured of the coil holding body 260, the frame 270 and the fixed cover 230. A movable module 300 provided with a photographing unit 1 is disposed on an inner side of the fixed body 210 which is structured as described above. An upper plate part 231 located at an end part on the object side of the fixed cover 230 is formed with a rectangular window-shaped opening part 231a. In this embodiment, a substantially all region superposed on the movable module 300 in an optical axis "L" direction is formed as the opening part 231a. Further, an end part of the fixed cover 230 on the opposite side to the object side is formed to be an open end.
(Structure of Photographing Unit 1)

Figure 3:
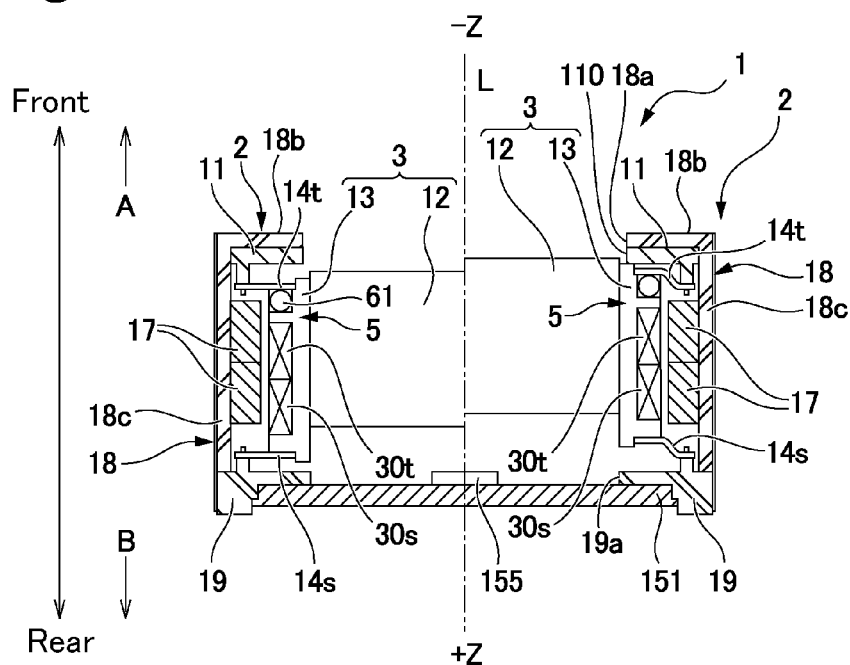
FIG. 3 is an explanatory view showing a photographing unit which is incorporated into the movable module of the optical unit in accordance with the first embodiment of the present invention.

FIG. 3 is an explanatory view showing the photographing unit 1 (optical element unit) which is incorporated into the movable module 300 of the optical unit 100 in accordance with the first embodiment of the present invention. A left half portion in FIG. 3 shows a view in which the movable body is located at an infinity position (normal photographing position) and a right half portion in FIG. 3 shows a view in which the movable body is located at a macro-position (close-up photographing position).

As shown in FIG. 3, the photographing unit 1 is, for example, an optical element unit in which a plurality of lenses 10 as an optical element (see FIG. 1(a)) is moved in both directions, i.e., in an "A"-direction (front side) approaching an object to be photographed (object side) along the optical axis "L" direction and in a "B"-direction (rear side) approaching the opposite side (imaging element side/image side) to the object to be photographed. The photographing unit 1 is formed in a roughly rectangular prism shape. The photographing unit 1 is generally provided with the movable body 3 which holds optical elements such as a plurality of lenses 10 (see FIG. 1(a)) and a fixed diaphragm on its inner side, a lens drive mechanism 5 for moving the movable body 3 along the optical axis "L" direction, and a support body 2 on which the lens drive mechanism 5, the movable body 3 and the like are mounted. The movable body 3 is provided with a lens holder 12, which is formed in a cylindrical tube shape and holds the lenses and the fixed diaphragm, and a coil holder 13 which holds the lens holder 12 on its inner side. Lens drive coils 30s and 30t structuring the lens drive mechanism 5 are held on an outer peripheral side face of the coil holder 13.

The support body 2 is provided with an imaging element holder 19, which is formed in a rectangular plate shape and positions an imaging element 155 on the opposite side to the object side, a box-shaped case 18 which covers the imaging element holder 19 from the object side, and a spacer 11 which is formed in a rectangular plate shape and is disposed on an inner side of the case 18. Circular incident windows 110 and 18a are respectively formed at centers of the case 18 and the spacer 11 for taking light from the object to be photographed to the lenses. Further, a window 19a for guiding the incident light to the imaging element 155 is formed at a center of the imaging element holder 19. In the photographing unit 1, the support body 2 is provided with a circuit board 151 on which the imaging element 155 is mounted and the circuit board 151 is fixed to an under face of the imaging element holder 19.

The case 18 is made of a ferromagnetic plate such as a steel plate and also functions as a yoke. Therefore, the case 18 structures an interlinkage magnetic field generating body for generating interlinkage magnetic field in the lens drive coils 30s and 30t together with lens drive magnets 17 described below. The interlinkage magnetic field generating body structures the lens drive mechanism 5 together with the lens drive coils 30s and 30t which are wound around an outer peripheral face of the coil holder 13.

The support body 2 and the movable body 3 are connected with each other through metal spring members 14s and 14t which are provided at positions separated in the optical axis "L" direction. Basic structures of the spring members 14s and 14t are similar to each other and they are provided with an outer peripheral side connecting part held by a support body 2 side, a ring-shaped inner peripheral side connecting part held by a movable body 3 side, and an arm-shaped plate spring part which connects the outer peripheral side connecting part with the inner peripheral side connecting part. The outer peripheral side connecting part of the spring member 14s on the imaging element 155 side is held by the imaging element holder 19 and its inner peripheral side connecting part is connected with an end face on the imaging element side of the coil holder 13 of the movable body 3. The outer peripheral side connecting part of the spring member 14t on the object side is held by the spacer 11 and its inner peripheral side connecting part is connected with an end face on the object side of the coil holder 13 of the movable body 3. In this manner, the movable body 3 is movably supported by the support body 2 in the optical axis "L" direction through the spring members 14s and 14t. Each of the spring members 14s and 14t is made of nonmagnetic metal such as beryllium copper or SUS steel material and is formed by means of that a thin plate having a certain thickness is performed by press working or etching processing using photo lithography technique. The spring member 14s is divided into two pieces and respective coil ends of the lens drive coils 30s and 30t are respectively connected with the spring pieces. Further, the two spring pieces of the spring member 14s are respectively formed with a terminal and thus the spring member 14s functions as a power supply member to the lens drive coils 30s and 30t.

A ring-shaped magnetic piece 61 is held on an object side end face of the coil holder 13 and the magnetic piece 61 is located at a position on the object side with respect to the lens drive magnet 17. Therefore, the magnetic piece 61 applies an urging force in the optical axis "L" direction to the movable body 3 by an attraction force acted between the lens drive magnet 17 and the magnetic piece 61. Therefore, at a non-energized time (home position), the lens holder 12 is maintained on an imaging element 155 side in a stationary state by an attraction force acted between the lens drive magnet 17 and the magnetic piece 61. Further, the magnetic piece 61 acts as a yoke and thus leakage flux from a magnetic path which is structured between the lens drive magnets 17 and the lens drive coils 30s and 30t is reduced. As the magnetic piece 61, a bar-shaped magnetic body or a spherical magnetic body may be used. In a case that the magnetic piece 61 is formed in a ring shape, it is effective that, when the lens holder 12 is to be moved in the optical axis "L" direction, magnetic attraction forces acted between the lens drive magnets 17 and the magnetic piece 61 become isotropic. In addition, when the lens drive coils 30s and 30t are energized, the magnetic piece 61 is moved in a direction separated from the lens drive magnets 17 and thus an unnecessary force that the lens holder 12 is pressed against the imaging element 155 side is not acted. Therefore, the lens holder 12 is moved in the optical axis "L" direction with a small electric power.

In the photographing unit 1 in this embodiment, when viewed in the direction of the optical axis "L", the lens 10 (see FIG. 1(a)) is circular but the case 18 used in the support body 2 is in a rectangular box-like shape. Therefore, the case 18 is provided with a rectangular tube-shaped body part 18c and an upper plate part 18b formed with the incident window 18a is provided on the upper face side of the rectangular tube-shaped body part 18c. The lens drive magnet 17 is fixed to side face parts which correspond to sides of a quadrangle of the rectangular tube-shaped body part 18c. Each of the lens drive magnets 17 is formed of a rectangular flat plate-shaped permanent magnet. Each of four lens drive magnets 17 is divided into two pieces in the direction of the optical axis "L" and each magnet piece is magnetized so that a magnetic pole of its inner face and a magnetic pole of its outer face are different from each other.

In this embodiment, when the coil holder 13 is viewed in the direction of the optical axis "L", its inner peripheral shape is circular but its outer peripheral side face which determines the outer peripheral shape of the coil holder 13 is quadrangular and the lens drive coils 30s and 30t are wound around the coil holder 13. In this embodiment, four lens drive magnets 17 are respectively divided into two pieces in the optical axis "L" direction and each of the magnet pieces is magnetized so that a magnetic pole of its inner face and a magnetic pole of its outer face are different from each other and thus winding directions of the two lens drive coils 30s and 30t are opposite to each other. The movable body 3 structured as described above is disposed on an inner side of the case 18. As a result, the lens drive coils 30s and 30t respectively face the lens drive magnets 17 which are fixed to the inner faces of the rectangular tube-shaped body parts 18c of the case 18.

In the photographing unit 1 structured as described above, the movable body 3 is normally located on the imaging element side ("+Z" side) and, in this state, when an electric current is supplied to the lens drive coils 30s and 30t in a predetermined direction, an electro-magnetic force toward the object side ("−Z" side) is applied to the respective lens drive coils 30s and 30t. Therefore, the movable body 3 to which the lens drive coils 30s and 30t are fixed begins to move to the object side (front side). In this case, elastic forces restricting movement of the movable body 3 are generated between the spring member 14t and the front end of the movable body 3 and between the spring member 14s and the rear end of the movable body 3. Therefore, the movable body 3 is stopped when the electro-magnetic force for moving the movable body 3 to the front side and the elastic force for restricting the movement of the movable body 3 are balanced. In this case, when an amount of the electric current which is supplied to the lens drive coils 30s and 30t is adjusted depending on the elastic forces of the spring members 14s and 14t acting on the movable body 3, the movable body 3 can be stopped at a desired position.

(Internal Structure of Optical Unit 100)

In the optical unit 100 shown in FIGS. 1(a) and 1(b), a shake correction mechanism (hand shake correction mechanism) for displacing the photographing unit 1 to perform shake correction is structured on an inner side of the fixed cover 230. In order to structure the shake correction mechanism, in this embodiment, as shown in FIGS. 1(a) and 1(b) and FIGS. 2(a), 2(b) and 2(c), the optical unit 100 includes a fixed body 210, a movable module 300 holding the photographing unit 1 on its inner side, and a plate-shaped spring member 600 which is connected with the fixed body 210 and the movable module 300. A movable module drive mechanism is structured between the movable module 300 and the fixed body 210 for generating a magnetic drive force which relatively displaces the movable module 300 with respect to the fixed body 210 as described below. In the optical unit 100, a sensor flexible circuit board 410 and a drive flexible circuit board 420 are disposed on an opposite side to the object side.

(Structure of Fixed Body 210)

As shown in FIGS. 1(a) and 1(b) and FIG. 2(a), in the fixed body 210, the coil holding body 260 is provided with support pillar portions 261 at four corner portions and upper end parts of the support portions 261 are connected with each other through crosspiece parts 262. The support pillar portion 261 is formed with a hole for passing a screw 279 (see FIG. 1(b)). Four side faces of the coil holding body 260 are fixed with two "X"-side coils 571 disposed on both sides of the movable module 300 in the "X"-axis direction and two "Y"-side coils 572 disposed on both sides of the movable module 300 in the "Y"-axis direction. The "X"-side coil 571 and the "Y"-side coil 572 are an air-core coil which is wound around in a rectangular frame shape and is provided with two effective side portions facing each other in the "Z"-axis direction.

In the fixed body 210, a frame 270 formed in a rectangular frame shape is disposed on an opposite side to the object side so as to superpose on the coil holding body 260. The frame 270 is provided with a rectangular frame-shaped part 271 and cylindrical tube parts 272 which are protruded toward the coil holding body 260 at four corner portions of the frame-shaped part 271. The cylindrical tube part 272 is formed with a hole for passing a screw 279 (see FIG. 1(b)). The corner portions of the coil holding body 260 are superposed on the cylindrical tube parts 272 of the frame 270. Therefore, the coil holding body 260 and the frame 270 are fixed to each other at four corner portions by the screws 279 and, in this fixed state, a fixed body side opening part 210b whose size is larger than an area of the photographing unit 1 when projected in the optical axis "L" direction is opened in the optical axis "L" direction on the opposite side to the object side in the fixed body 210.

An auxiliary circuit board 450 is used for power supply to the "X"-side coils 571 and the "Y"-side coils 572. An end part of the auxiliary circuit board 450 is fixed to an under face of the frame 270 (face on the opposite side to the object side) when the frame 270 and the coil holding body 260 are connected with each other by the screws 279.

(Structure of Movable Module 300)

Figure 4:
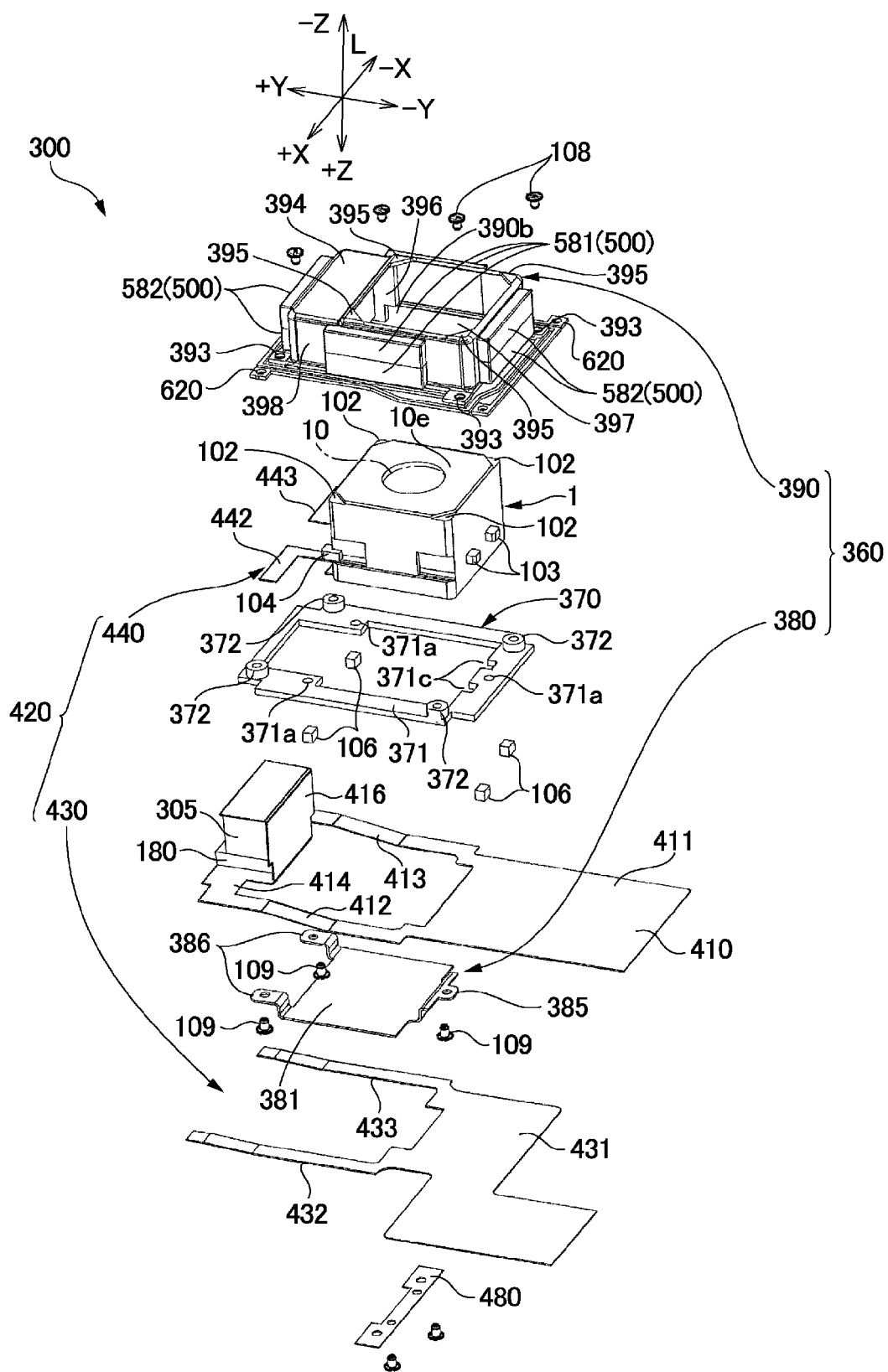
FIG. 4 is an exploded perspective view showing the movable module of the optical unit in accordance with the first embodiment of the present invention.

FIG. 4 is an exploded perspective view showing the movable module 300 of the optical unit 100 in accordance with the first embodiment of the present invention. As shown in FIGS. 1(a) and 1(b), FIGS. 2(b) and 2(c) and FIG. 4, the movable module 300 in the optical unit 100 in this embodiment is provided with the photographing unit 1 described with reference to FIG. 3, a rectangular tube-shaped module cover 390 which accommodates the photographing unit 1 on its inner side, a sensor holding plate 370 which is formed in a rectangular frame shape and is disposed so as to superpose on one side of the module cover 390 in the "Z"-axis direction, and a pressing member 380 which is disposed so as to superpose on one side of the sensor holding plate 370 in the "Z"-axis direction.

The module cover 390 is provided with a rectangular tube-shaped body part 398. An outer face of the rectangular tube-shaped body part 398 is fixed with "X"-side magnets 581 which are disposed on both sides of the movable module 300 in the "X"-axis direction and "Y"-side magnets 582 which are disposed on both sides of the movable module 300 in the "Y"-axis direction. Each of the "X"-side magnet 581 and the "Y"-side magnet 582 is structured of two flat plate-shaped magnet pieces arranged in the "Z"-axis direction. The two magnet pieces are magnetized so that an inner face and an outer face are magnetized in different poles from each other and are magnetized so that magnetic poles in the optical axis "L" direction are different from each other. The module cover 390 is made of a magnetic plate and functions as a back yoke.

An inner side of the rectangular tube-shaped body part 398 is formed as a sensor accommodation part 396 where a gyroscope 180 (shake detection sensor/angular velocity sensor) is accommodated and as a photographing unit accommodation part 397 where the photographing unit 1 is accommodated. The sensor accommodation part 396 is provided with an upper plate part 394. In the sensor accommodation part 396, a block 305 is located on a lower side of the upper plate part 394 and the gyroscope 180 is disposed at a lower position of the block 305.

In the module cover 390, an object side end part of a portion of the rectangular tube-shaped body part 398 corresponding to the photographing unit accommodation part 397 is located on a further object side with respect to the upper plate part 35 of the sensor accommodation part 396. Four corner portions of the photographing unit accommodation part 397 are formed with a triangular support plate part 395 (support part).

Further, end parts on the opposite side to the object side at four corner portions of the rectangular tube-shaped body part 398 of the module cover 390 are formed with a connecting part 393 protruded toward an outer peripheral side. Each of the four connecting parts 393 is formed with a hole for passing a screw 108.

In this embodiment, an object side end part of the rectangular tube-shaped body part 398 of the module cover 390 is formed as an open end and, in the module cover 390, a module cover side opening part 390b is opened in the optical axis "L" direction. An area of the module cover side opening part 390b is larger than a projected area of the photographing unit 1 in the optical axis "L" direction and the module cover side opening part 390b is superposed on the fixed body side opening part 210b.

An end part 10e on the object side of the photographing unit 1 is formed with four triangular recessed parts 102 which are recessed in the optical axis "L" direction at a portion superposed on the support plate part 395 of the module cover 390. When the photographing unit 1 is accommodated on the inner side of the module cover 390, the support plate parts 395 of the module cover 390 are fitted to the recessed parts 102 of the photographing unit 1.

Further, in four outer side faces of the photographing unit 1, an end face located on the "–Y"-axis side is formed with two projections 103 and both side end parts of an end face located on the "+Y"-axis side are formed with a projection 104. In this embodiment, the outer side of the photographing unit 1 is the case 18 shown in FIG. 3 and thus all of the end part 10e, the recessed parts 102, the projections 103 and the projections 104 are formed by using the case 18. An end face of the photographing unit 1 on the opposite side to the object side is connected with a circuit board main body part of a sub circuit board 440 of the drive flexible circuit board 420.

The sensor holding plate 370 is provided with a rectangular frame part 371 and cylindrical tube parts 372 which are protruded toward the module cover 390 at diagonal positions of the rectangular frame part 371. The cylindrical tube part 372 is formed with a through hole for fitting a screw 108, and a hole 371*a* for fitting a screw 109 is formed in a pair of side parts facing each other and another side part of the rectangular frame part 371. Further, an inner edge of the side part of the rectangular frame part 371 where only one hole 371*a* is formed is formed with two cut-out parts 371*c* for holding an elastic spacer 106 on an inner side.

The pressing member 380 includes a rectangular flat plate part 381, two seat parts 386 which are protruded toward the sensor holding plate 370 from a pair of side parts facing each other of the flat plate part 381, and a seat part 385 which is protruded toward the sensor holding plate 370 from another side part of the flat plate part 381. The seat parts 385 and 386 are formed with a hole for passing the screw 109. In this embodiment, a dimension in the "X" direction of the seat part 385 is longer than that of the seat part 386.

(Structure of Drive Flexible Circuit Board 420)

As shown in FIGS. 1(*a*) and 1(*b*), FIGS. 2(*a*) through 2(*c*) and FIG. 4, in the optical unit 100, the drive flexible circuit board 420 is disposed on the opposite side to the object side with respect to the fixed body 210. The drive flexible circuit board 420 is comprised of a main circuit board 430 and a sub circuit board 440 connected with the main circuit board 430. The main circuit board 430 is provided with a circuit board main body part 431 which is formed in a connected shape of two rectangular portions and two belt-shaped elongated connecting parts 432 and 433 which are extended toward the "+Y"-axis direction from both end portions in a widthwise direction ("X"-axis direction) of the circuit board main body part 431. The sub circuit board 440 is provided with a rectangular circuit board main body part (not shown) and strip-shaped connection parts 442 and 443 which are extended toward the "+Y"-axis direction from portions located on a little inner side with respect to both end portions in the widthwise direction ("X"-axis direction) of the circuit board main body part and then are bent toward both sides in the "X"-axis direction. In this embodiment, tip end parts of the elongated connecting parts 432 and 433 of the main circuit board 430 and tip end parts of the strip-shaped connection parts 442 and 443 of the sub circuit board 440 are joined to each other. In this manner, the main circuit board 430 and the sub circuit board 440 are integrated with each other to structure the drive flexible circuit board 420 and the main circuit board 430 and the sub circuit board 440 are electrically connected with each other.

(Structure of Sensor Flexible Circuit Board 410)

In the optical unit 100, a sensor flexible circuit board 410 is disposed on the opposite side to the object side with respect to the photographing unit 1. The sensor flexible circuit board 410 is provided with a rectangular circuit board main body part 411, belt-shaped elongated connecting parts 412 and 413 which are extended toward the "+Y"-axis direction from both end portions in a widthwise direction ("X" direction) of the circuit board main body part 411, and a sensor mounting part 414 having a wider width which connects tip end parts of the elongated connecting parts 412 and 413. Further, the sensor flexible circuit board 410 is provided with a bent portion 416 which is extended from a portion of the sensor mounting part 414 so as to be interposed between the elongated connecting parts 412 and 413. The bent portion 416 is perpendicularly bent toward the object side in the vicinity of a connecting part with the sensor mounting part 414 and then is bent toward one side in the "Y"-axis direction.

In the sensor flexible circuit board 410, a gyroscope 180 as a hand shake sensor (angular velocity sensor) is mounted on the sensor mounting part 414 and a block 305 is mounted on an inner side of the bent portion 416. The block 305 functions as a pressing and fixing member for the gyroscope 180.

(Structure of Spring Member 600)

The movable module 300 which is structured as described above is supported by the plate-shaped spring member 600 in a state so as to be capable of displacing with respect to the fixed body 210 described with reference to FIGS. 2(*a*) through 2(*c*). As shown in FIG. 2(*c*), the spring member 600 is provided with movable module side connecting parts 610 which are disposed on an inner side and are connected with the movable module 300, fixed body side connecting parts 620 which are disposed on an outer side and are connected with the fixed body 210, and arm parts 630 which are extended between the movable module side connecting part 610 and the fixed body side connecting part 620. The movable module side connecting part 610 and the fixed body side connecting part 620 are respectively formed with a hole for passing the screw 108 and the screw 279. The spring member 600 is made of nonmagnetic metal such as beryllium copper or nonmagnetic SUS steel material and is formed by means of that a thin plate having a certain thickness is performed by press working or etching processing using photo lithography technique.

In this embodiment, the spring member 600 is formed in a rectangular frame shape as a whole and each of the movable module side connecting part 610 and the fixed body side connecting part 620 is disposed at four corner portions of the spring member 600. Each of the four arm parts 630 is extended in the same direction in the circumferential direction from the movable module side connecting part 610 and is perpendicularly bent and extended to the fixed body side connecting part 620. In accordance with an embodiment of the present invention, the spring member 600 may be structured so that the movable module side connecting parts 610 and the fixed body side connecting parts 620 are connected with each other in the circumferential direction.

(Manufacturing Method for Optical Unit 10)

FIGS. 5(*a*) and 5(*b*) and FIGS. 6(*a*) and 6(*b*) are explanatory views showing a manufacturing method for the optical unit 100 in accordance with the first embodiment of the present invention. In the following descriptions, a state where the fixed cover 230 is detached from the fixed body 210 is referred to as the fixed body 210. However, the following steps may be performed in a state that the fixed cover 230 is attached.

In order to manufacture the optical unit 100 in this embodiment, the sensor holding plate 370 and the module cover 390 are connected with each other with the screws 108. In this case, the movable module side connecting parts 610 of the spring member 600 have been previously disposed between the cylindrical tube parts 372 of the sensor holding plate 370 and the connecting parts 393 of the module cover 390. Therefore, when the sensor holding plate 370 and the module cover 390 are connected with each other with the screws 108, the movable module side connecting parts 610 of the spring member 600 are sandwiched between the sensor holding plate 370 and the module cover 390. Further, in this case, the sensor mounting part 414 of the sensor flexible circuit board 410 on which the gyroscope 180 is mounted and the bent portion 416 on which the block 305 is mounted have been previously disposed between sensor holding plate 370 and module cover 390. As a result, the gyroscope 180 is set in a state that the gyroscope 180 is sandwiched together with the block 305 between the module cover 390 and the sensor holding plate 370. In this state, the center of the gyroscope 180 is located in a region surrounded by the connecting positions (positions of the screws 108) of the module cover 390 with the pressing member 380. In this embodiment, the gyroscope 180 is formed in a rectangular flat shape and thus the center of the gyroscope 180 is determined as an intersecting point of straight lines obtained by connecting diagonal corners of the gyroscope 180.

Next, in the fixed body 210 shown in FIG. 2(a), when the frame 270 and the coil holding body 260 are to be connected with each other with the screws 279, the fixed body side connecting parts 620 of the spring member 600 are disposed between the cylindrical tube parts 272 of the frame 270 and the support pillar portions 261 of the coil holding body 260. Therefore, the fixed body side connecting parts 620 of the spring member 600 are sandwiched between the frame 270 and the coil holding body 260. In this state, the module cover 390 and the sensor holding plate 370 are set in a supported state so as to be capable of displacing with respect to the fixed body 210 through the spring member 600 (first step).

In this case, the circuit board main body part 411 of the sensor flexible circuit board 410 and the end part of the auxiliary circuit board 450 are superposed on the frame 270 and, in this state, the screws 279 are fixed. As a result, the circuit board main body part 411 of the sensor flexible circuit board 410 and the end part of the auxiliary circuit board 450 are fixed to the frame 270 with the screws 279. Further, in the state where the module cover 390 and the sensor holding plate 370 are disposed on the inner side of the fixed body 210, the "X"-side magnets 581 of the movable module 300 and the "X"-side coils 571 of the coil holding body 260 are faced each other to structure an "X"-side magnetic drive mechanism of the movable module drive mechanism. Further, the "Y"-side magnets 582 of the movable module 300 and the "Y"-side coils 572 of the coil holding body 260 are faced each other to structure a "Y"-side magnetic drive mechanism of the movable module drive mechanism.

Further, as shown in FIG. 5(a), the elongated connecting parts 412 and 413 of the sensor flexible circuit board 410 are located on side positions with respect to a space where the photographing unit 1 is inserted. The module cover side opening part 390b of the module cover 390 is not closed by the elongated connecting parts 412 and 413 of the sensor flexible circuit board 410. Further, the fixed body side opening part 210b of the fixed body 210 is larger than the module cover side opening part 390b and thus, even when the module cover 390 is disposed on the inner side of the fixed body 210, the module cover side opening part 390b is not closed by the fixed body 210.

Next, as shown in FIG. 5(b), the photographing unit 1 is inserted into an inner side of the module cover 390 from the end part of the module cover 390 on the opposite side to the object side through the fixed body side opening part 210b and the module cover side opening part 390b to dispose the photographing unit 1 on the inner side of the module cover 390 (second step).

Next, as shown in FIG. 6(a), an elastic spacer 106 made of rubber or the like is fitted to the cut-out parts 371c of the sensor holding plate 370 and the recessed corner portions of the rectangular frame part 371. As a result, the elastic spacer 106 is disposed at positions superposed on the projections 103 and 104 of the photographing unit 1 in the optical axis "L" direction. In this case, the circuit board main body part 441 of the sub circuit board 440 has been joined to the end face on the opposite side to the object side of the photographing unit 1.

After that, as shown in FIG. 6(b), the pressing member 380 is superposed on the photographing unit 1 on the opposite side to the object side and screws 109 are fitted to the holes 371a of the sensor holding plate 370 through the holes of the seat parts 385 and 386 of the pressing member 380 and thus the pressing member 380 is connected with the module cover 390 through the sensor holding plate 370. As a result, the photographing unit 1 is sandwiched between the support plate part 395 of the module cover 390 and the pressing member 380.

After that, as shown in FIG. 1(b), the main circuit board 430 is superposed and the circuit board main body part 431 is fixed to the frame-shaped part 271 of the frame 270 by the fixing plate 480 with screws 491. As a result, the tip end parts of the elongated connecting parts 432 and 433 of the main circuit board 430 and the tip end parts of the strip-shaped connection parts 442 and 443 of the sub circuit board 440 are superposed on each other and thus the tip end parts of the elongated connecting parts 432 and 433 of the main circuit board 430 and the tip end parts of the strip-shaped connection parts 442 and 443 of the sub circuit board 440 are joined with each other.

When the optical unit 100 is assembled as described above, the movable module 300 is supported so as to be capable of being displaced with respect to the fixed body 210 through the spring member 600. Further, on the object side, the recessed part 102 is fitted to the support plate part 395 of the module cover 390 and the photographing unit 1 is directly abutted with the module cover 390 and, on the opposite side to the object side, the projections 103 and 104 of the photographing unit 1 and the seat parts 385 and 386 of the pressing member 380 are abutted with each other through the elastic spacer 106. Therefore, even when dimensional errors are occurred in the respective members, the dimensional errors are absorbed by compression of the elastic spacer 106.

In accordance with an embodiment of the present invention, it may be manufactured that, in a step before the movable module 300 has been assembled, the tip end parts of the elongated connecting parts 432 and 433 of the main circuit board 430 and the tip end parts of the strip-shaped connection parts 442 and 443 of the sub circuit board 440 are joined to each other to structure the drive flexible circuit board 420 and, in this state, the circuit board main body part 441 of the sub circuit board 440 is joined to the end face on the opposite side to the object side of the photographing unit 1.

(Hand Shake Correcting Operation)

In a monitoring result of the gyroscope 180 in the optical unit 100 in this embodiment, when the movable module 300 is detected to be swung around the "Y"-axis by a hand shake, energization to the "X"-side coils 571 is controlled so as to cancel the shake and the movable module 300 is swung around the "Y"-axis. Further, in a monitoring result of the gyroscope 180, when the movable module 300 is detected to be swung around the "X"-axis by a hand shake, energization to the "Y"-side coils 572 is controlled so as to cancel the shake and the movable module 300 is swung around the "X"-axis. Therefore, the swing of the movable module 300 can be corrected. Further, when the swing around the "X"-axis of the movable module 300 and the swing around the "Y"-axis are combined with each other, the movable module 300 can be displaced for the entire "X-Y" plane. Therefore, all shakes occurred in the optical unit 100 can be corrected surely.

(Principal Effects in this Embodiment)

As described above, in the optical unit 100 and its manufacturing method in this embodiment, the fixed body 210 is provided with the fixed body side opening part 210b which is opened on an opposite side (first direction side) to an object to be photographed side and the module cover 390 is provided with the module cover side opening part 390b on an opposite side (first direction) to the object side at a position superposed on the fixed body side opening part 210b. Therefore, in the first step, the module cover 390 is mounted on the fixed body 210 through the spring member 600 and the movable module drive mechanism 500 is provided between the module cover 390 and the fixed body 210 and, after that, in the second step, the photographing unit 1 is inserted on the inner side of the module cover 390 through the fixed body side opening part 210b and the module cover side opening part 390b. Therefore, the photographing unit 1 can be manufactured in a separate step from a step in which the module cover 390, the spring member 600, the movable module drive mechanism 500 are attached to the fixed body 210. Accordingly, different from a case that inspection is performed after all the members have been assembled, inspection can be performed during manufacturing. Therefore, a loss caused by a defective product can be restrained.

Further, the support plate part 395 as a support part is provided on the object side (second direction side) of the module cover 390 and the pressing member 380 is provided on the opposite side (first direction side) to the object side. Therefore, when the photographing unit 1 is inserted in the inside of the module cover 390, the end part on the object side of the photographing unit 1 (second direction side) is supported by the support plate part 395. Further, after the pressing member 380 is attached, the end part on the opposite side (first direction side) to the object side of the photographing unit 1 is supported by the pressing member 380. Therefore, different from a structure in which, after the photographing unit 1 is accommodated in the inside of the module cover 390, the photographing unit 1 is fixed to the inside of the module cover 390 by adhesion, welding or the like, assembling is easily performed and displacement of the optical axis "L" or the like is hard to be occurred. Accordingly, the production efficiency and yield of the optical unit 100 can be improved.

In addition, after the photographing unit 1 is mounted, only the photographing unit 1 can be exchanged and, when the optical unit 100 is to be manufactured, the photographing unit 1 can be easily changed to another photographing unit 1.

Further, in this embodiment, the support part which supports the end part on the object side of the photographing unit 1 (second direction side) is the support plate part 395 of the module cover 390 and thus, even when the support part is not structured by using a separate member, the end part on the object side of the photographing unit 1 (second direction side) is supported. Moreover, the portion of the photographing unit 1 which is superposed on the support plate part 395 is formed with the recessed part 102 which is recessed in the optical axis "L" direction and thus, even when the module cover 390 is provided with the support plate part 395, the movable module 300 can be made thinner by a depth of the recessed part 102 and the optical unit 100 can be effectively made thinner.

Further, the module cover 390 and the photographing unit 1 are directly abutted with each other and the pressing member 380 is abutted with the photographing unit 1 through the elastic spacer 106. Therefore, even when dimensional errors are occurred in the respective members, the dimensional errors are absorbed by compression of the elastic spacer 106 and thus the photographing unit 1 is surely sandwiched between the module cover 390 and the pressing member 380.

In this case, since the sensor holding plate 370 is surely connected, the gyroscope 180 detects a shake of the movable module 300 surely.

Further, in this embodiment, the sensor holding plate 370 is disposed so as to surround the periphery of the photographing unit 1 and the gyroscope 180 is held by the sensor holding plate 370 at a position where the gyroscope 180 is not superposed on the photographing unit 1 in the optical axis "L" direction. Therefore, since the gyroscope 180 and the photographing unit 1 are not superposed on each other in the optical axis "L" direction, the dimension in the optical axis "L" direction (thickness dimension) of the movable module 300 is reduced. Further, when the photographing unit 1 is to be inserted into the inner side of the module cover 390, the photographing unit 1 is not obstructed by the gyroscope 180.

Further, the sensor holding plate 370 is connected with both of the module cover 390 and the pressing member 380 and thus rigidity of the sensor holding plate 370 is large. In addition, the center position of the gyroscope 180 is disposed in a region surrounded by the connected portions of the sensor holding plate 370 with the module cover 390 and thus rigidity of the portion of the sensor holding plate 370 where the center of the gyroscope 180 is located is large. Therefore, the portion of the sensor holding plate 370 where the center of the gyroscope 180 is located is hard to vibrate and thus, even when the movable module 300 and the optical unit 100 are made thinner, unnecessary vibration is hard to occur in the gyroscope 180 and a shake of the movable module 300 can be surely corrected.

Second Embodiment

In the second embodiment, after a module cover and the like are mounted on a fixed body, a photographing unit (optical element unit) is inserted in the inside of the module cover from an object side (side to which an optical axis "L" is extended). Therefore, in the second embodiment, "first direction" and "second direction" are as follows:

First direction=direction where an optical axis "L" is extended (object side to be photographed)

Second direction=direction opposite to a side where the optical axis "L" is extended (opposite side to an object to be photographed)

(Structure of Optical Unit)

Figure 7A:
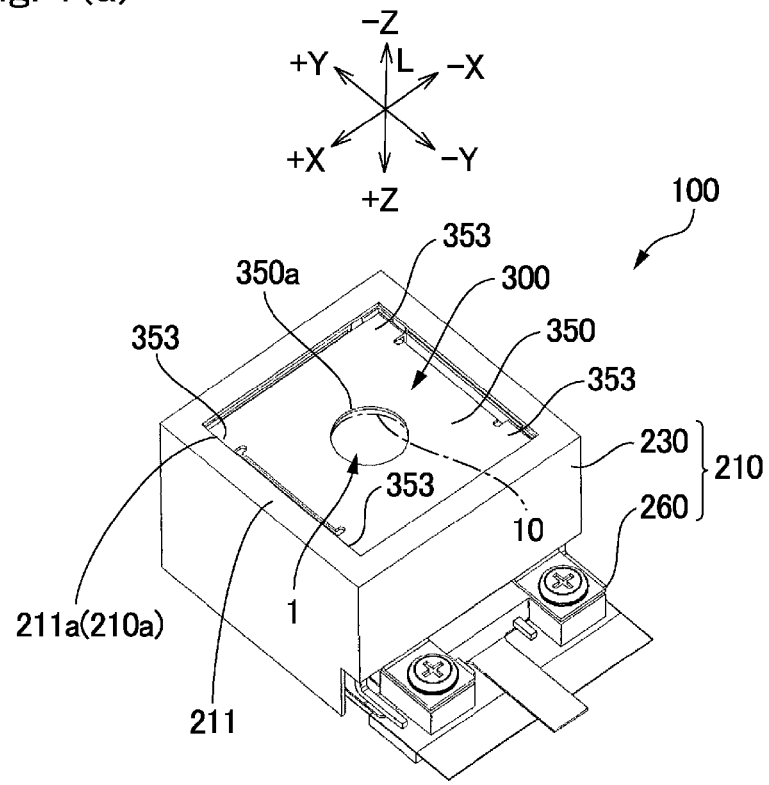
FIGS. 7(a) and 7(b) are explanatory views showing an optical unit for photographing in accordance with a second embodiment of the present invention.
Figure 7B:
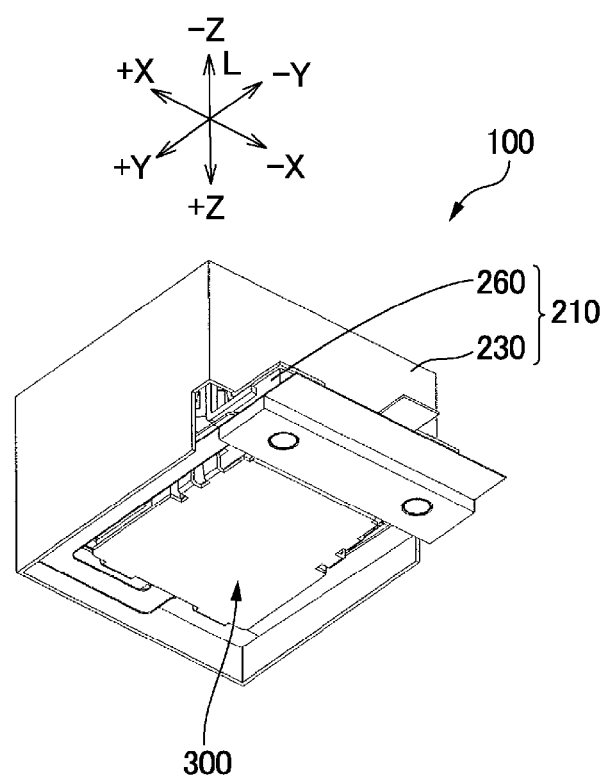
Figure 8A:
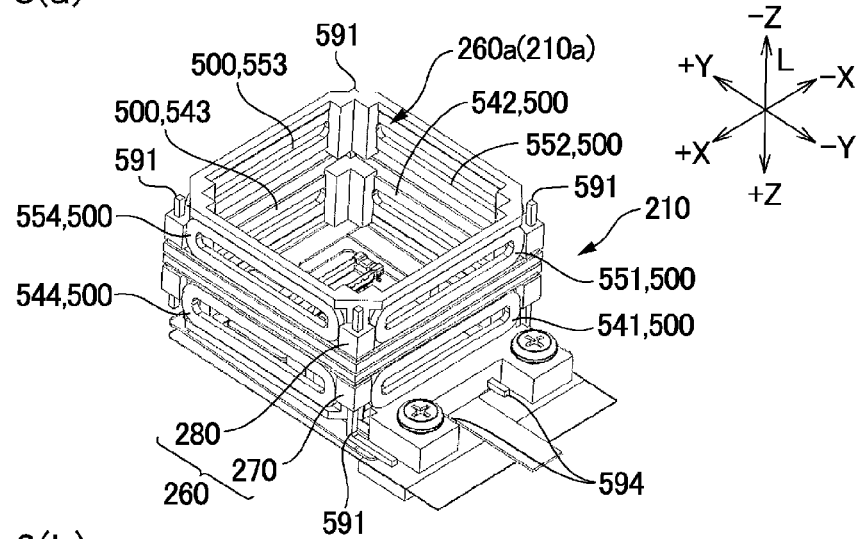
FIGS. 8(a), 8(b) and 8(c) are explanatory views showing a fixed body and a movable module of the optical unit in accordance with the second embodiment of the present invention.
Figure 8B:
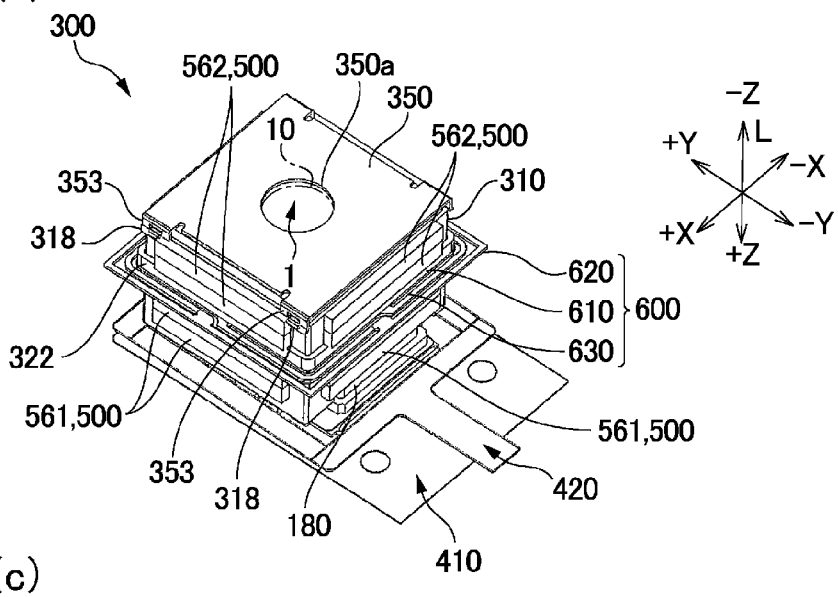
Figure 8C:
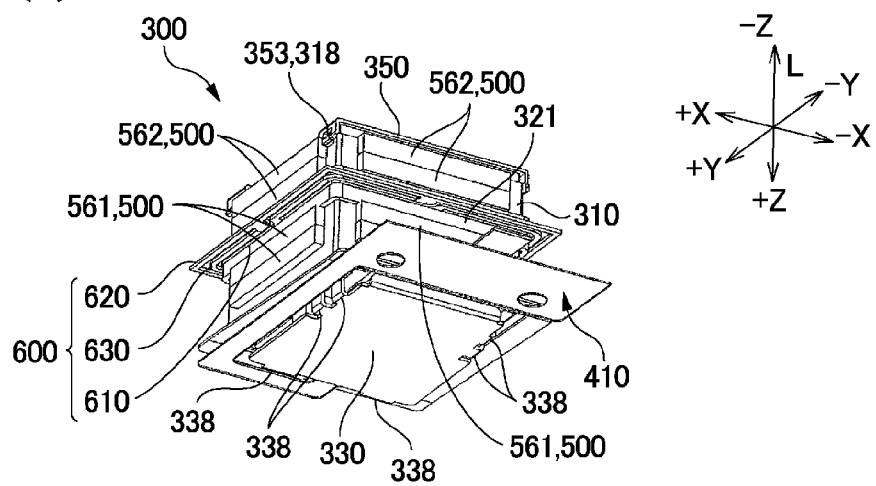

FIGS. 7(a) and 7(b) are explanatory views showing an optical unit for photographing in accordance with a second embodiment of the present invention. FIG. 7(a) is a perspective view showing the optical unit which is viewed from an object to be photographed side and FIG. 7(b) is a perspective view showing the optical unit which is viewed from an opposite side to the object side. FIGS. 8(a), 8(b) and 8(c) are explanatory views showing a fixed body and a movable module of the optical unit in accordance with the second embodiment of the present invention. FIG. 8(a) is a perspective view showing a fixed body which is viewed from an object side, FIG. 8(b) is a perspective view showing a movable module which is viewed from the object side, and FIG. 8(c) is a perspective view showing the movable module which is viewed from an opposite side to the object side. In FIG. 8(a), a fixed cover is not shown. Further, a basic structure in the second embodiment is similar to the first embodiment and thus the same reference signs are used in portions having the common functions.

An optical unit 100 shown in FIGS. 7(a) and 7(b) and FIGS. 8(a), 8(b) and 8(c) is, similarly to the first embodiment, a thin camera used in a cell phone with a camera and is formed in a roughly rectangular prism shape as a whole. Also in this embodiment, in order to structure a shake correction mechanism, the optical unit 100 includes a fixed body 210 comprised of a fixed cover 230 and a coil holding body 260, a movable module 300 holding the photographing unit 1 on its inner side, and a plate-shaped spring member 600 which is connected with the fixed body 210 and the movable module 300, and a movable module drive mechanism 500 for generating a magnetic drive force which relatively displaces the movable module 300 with respect to the fixed body 210 between the movable module 300 and the fixed body 210. The spring member 600 is provided with a movable module side connecting part 610 which is disposed on an inner side and is connected with the movable module 300, a fixed body side connecting part 620 which is disposed on an outer side and is connected with the fixed body 210, and an arm part 630 which is extended between the movable module side connecting part 610 and the fixed body side connecting part 620.

(Structure of Fixed Body 210)

An upper plate part 211 of the fixed cover 210 which is located at an end part on the object side is formed with a rectangular window-shaped opening part 211a. In this embodiment, an opening part 211a is formed in a wide region including a region superposed on the photographing unit 1 in the optical axis "L" direction.

A coil holding body 260 which is used in the fixed body 210 is comprised of a first coil holding member 270 which is formed in a rectangular frame shape and is located on an opposite side to the object side and a second coil holding member 280 which is disposed on the object side so as to be superposed on the first coil holding member 270. First coils 541, 542, 543 and 544 are held on a side face of the first coil holding member 270. Further, second coils 551, 552, 553 and 554 are held on a side face of the second coil holding member 280. The first coils 541, 542, 543 and 544 and the second coils 551, 552, 553 and 554 are an air-core coil which is wound around in a rectangular frame shape and is provided with two effective side portions facing each other in the "Z"-axis direction.

In this embodiment, in order to structure the coil holding body 260 by using the first coil holding member 270 and the second coil holding member 280, the first coil holding member 270 and the second coil holding member 280 are disposed so as to be superposed on each other in the "Z"-axis direction and then, four pin-shaped terminals 591 formed in a square bar shape are press-fitted to holes formed at four corner portions to connect the first coil holding member 270 and the second coil holding member 280 with each other. In this case, when the fixed body side connecting part 620 of the spring member 600 is disposed between the first coil holding member 270 and the second coil holding member 280, the fixed body side connecting part 620 is sandwiched and held by the first coil holding member 270 and the second coil holding member 280.

In this embodiment, the pin-shaped terminal 591 is penetrated through the first coil holding member 270 and the second coil holding member 280 in the "Z"-axis direction and both end parts of the pin-shaped terminal 591 are protruded from the coil holding body 260. Therefore, the first coils 541 through 544 and the second coils 551 through 554 can be electrically connected through four metal pin-shaped terminals 591. Accordingly, when two pin-shaped terminals 591 and two power supply terminals 594 held by the first coil holding member 270 are soldered to a sensor flexible circuit board 410, power supply to the first coils 541 through 544 and the second coils 551 through 554 can be performed.

An end part on the object side of the coil holding body 260 structured as described above is formed with an opening part 260a which is opened in the optical axis "L" direction. The opening part 260a has the same size as the opening part 211a of the fixed cover 210 and the size is larger than an area that the photographing unit 1 is projected in the optical axis "L" direction. In this embodiment, both of the opening parts 211a and 260a are included in the fixed body side opening part 210a.

(Structure of Movable Module 300)

Figure 9A:
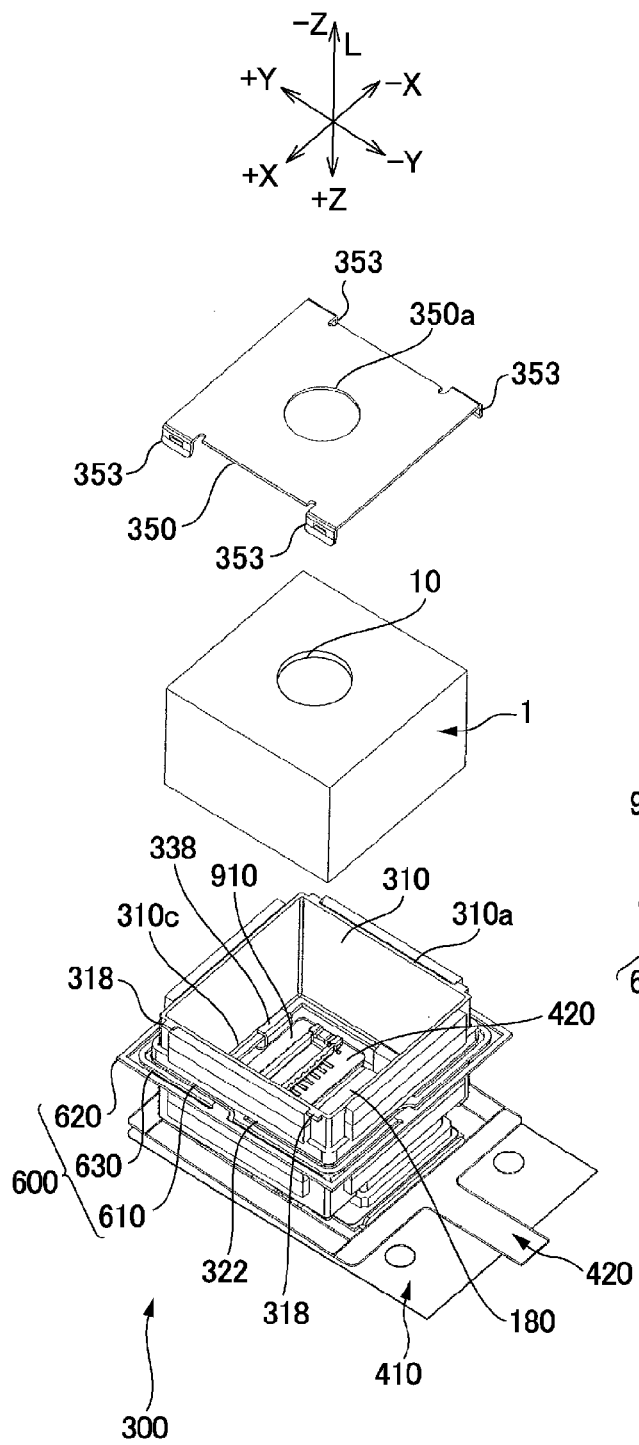
FIGS. 9(a) and 9(b) are explanatory views showing the movable module of the optical unit in accordance with the second embodiment of the present invention.
Figure 9B:
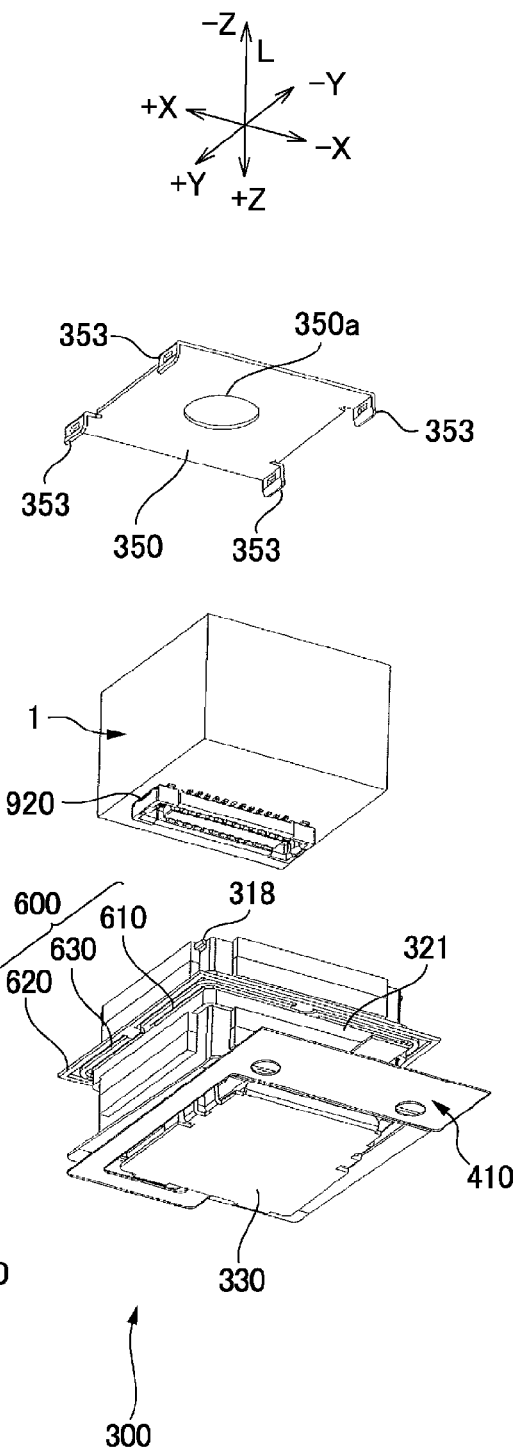
Figure 10A:
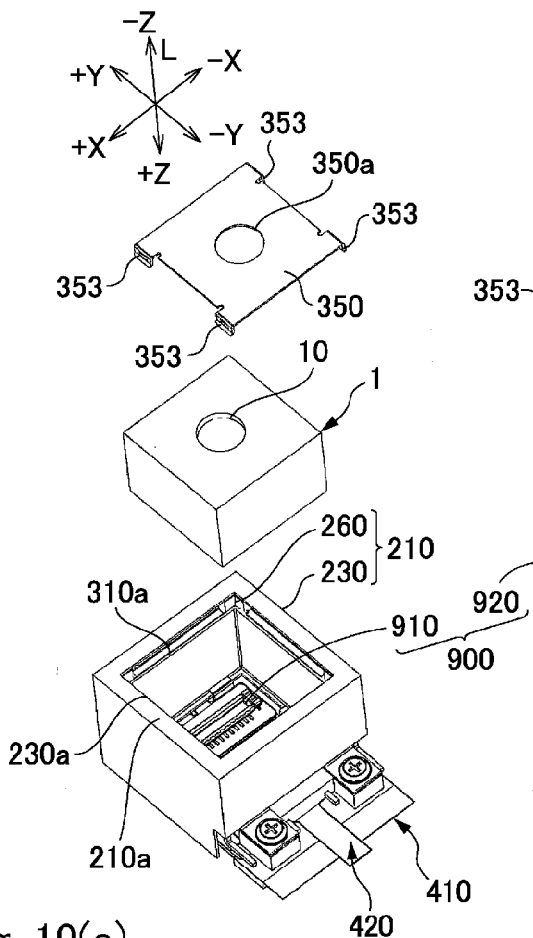
FIG. 10(a) through 10(d) are explanatory views showing a manufacturing method for the optical unit in accordance with the second embodiment of the present invention.
Figure 10B:
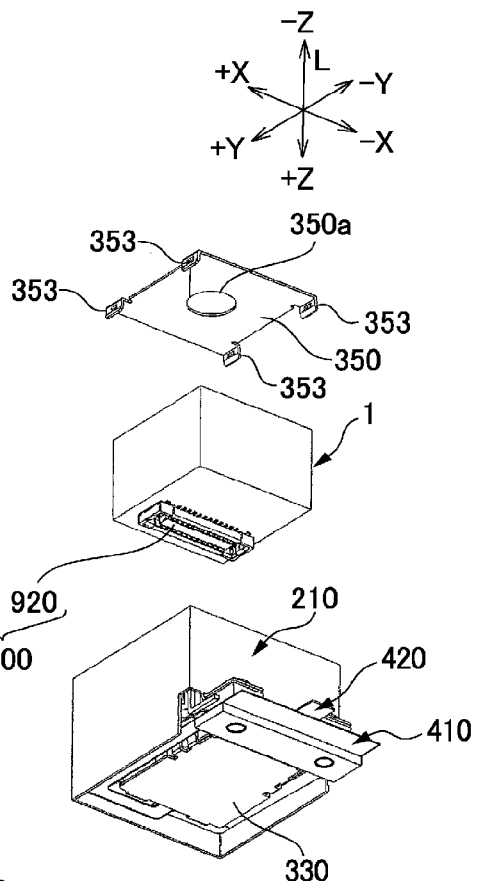
Figure 10C:
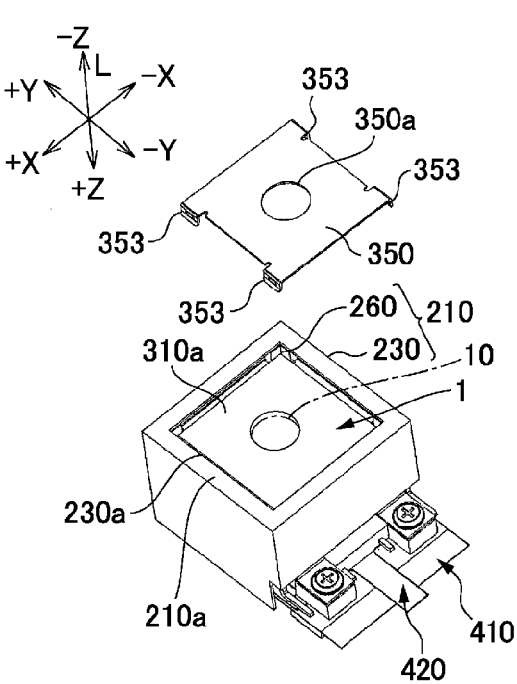
Figure 10D:
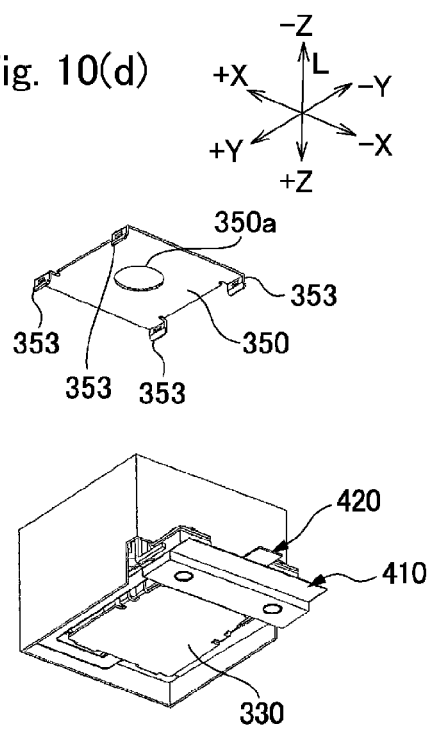

FIGS. 9(a) and 9(b) are explanatory views showing the movable module 300 of the optical unit 100 in accordance with the second embodiment of the present invention. FIG. 9(a) is an exploded perspective view showing the movable module 300 when viewed from an object to be photographed side and FIG. 9(b) is an exploded perspective view showing the movable module 300 when viewed from an opposite side to the object side.

As shown in FIGS. 8(b) and 8(c) and FIGS. 9(a) and 9(b), in the optical unit 100 in this embodiment, the movable module 300 is provided with the photographing unit 1 which is described with reference to FIG. 3, a rectangular tube-shaped module cover 310 which accommodates the photographing unit 1 on its inner side, a support member 330 which is connected with the module cover 310 on the opposite side to the object side with respect to the photographing unit 1, and a rectangular pressing member 350 which is connected with the module cover 310 on the object side with respect to the photographing unit 1.

In this embodiment, the module cover 310 is formed in a rectangular tube shape and is provided with a module cover side opening part 310a on the object side which is opened in the optical axis "L" direction and whose size is larger than an area formed by projecting the photographing unit 1 in the optical axis "L" direction. Further, the module cover 310 is provided with an opening part 310c on the opposite side to the object side and a connector member 910 mounted on a drive flexible circuit board 420 described below is located on an inner side of the opening part 310c.

The pressing member 350 is formed with a circular hole 350a for guiding light from an object to be photographed to the photographing unit 1. Further, the pressing member 350 is provided with hooks 353 which are protruded from the vicinities of four corners toward the module cover 310. The hooks 353 are engaged with engaging projections 318 of the module cover 310 and thus the pressing member 350 and the module cover 310 are connected with each other.

The support member 330 is provided with a hook 338 in two side portions facing each other in the "X"-axis direction and is also provided with a hook 338 in one side portion in the "Y"-axis direction. In this embodiment, bent portions of a plurality of the hooks 338 are located at different height positions and a bent portion to an inner side of the module cover 310 is fitted to a portion between the bent portions of the hook parts and, in this manner, the support member 330 and the module cover 310 are connected with each other. Further, an upper face of the support member 330 is provided with a gyro stopper (not shown). The gyro stopper secures a space for disposing the gyroscope 180 between the support member 330 and the photographing unit 1.

Further, the movable module 300 is provided with a first spacer member 321 and a second spacer member 322 which are fixed to an outer peripheral face of the module cover 310. The first spacer member 321 and the second spacer member 322 are fixed to the outer peripheral face of the module cover 310 in the vicinity of a substantially center in the optical axis "L" direction and the first spacer member 321 and the second spacer member 322 are adjacent to each other in the optical axis "L" direction.

Two first magnets 561 formed in a rectangular flat plate shape are disposed on each of four outer faces of the module cover 310 on the opposite side to the object side with respect to the first spacer member 321 so as to be adjacent to each other in the "Z"-axis direction. Further, two second magnets 562 formed in a rectangular flat plate shape are disposed on each of the four outer faces of the module cover 310 on the object side with respect to the second spacer member 322 so as to be adjacent to each other in the "Z"-axis direction.

(Holding Structure of Spring Member 600 on Movable Module 300 Side)

In this embodiment, the first spacer member 321 and the second spacer member 322 are used as a pair of spring holding members and the movable module side connecting part 610 of the spring member 600 and the module cover 310 (movable module 300) are connected with each other. In other words, when the first spacer member 321 and the second spacer member 322 are to be fixed to the module cover 310, the movable module side connecting part 610 of the spring member 600 is disposed between the first spacer member 321 and the second spacer member 322. As a result, the movable module side connecting part 610 of the spring member 600 is sandwiched and held by the first spacer member 321 and the second spacer member 322 from both sides in the optical axis "L" direction. Adhesion, welding or the like is performed in a state that the movable module side connecting part 610 of the spring member 600 is sandwiched and held by the first spacer member 321 and the second spacer member 322.

(Structure of Movable Module Drive Mechanism 500)

When the movable module 300 structured as described above is disposed on an inner side of the coil holding body 260 which is described with reference to FIG. 8(*a*) and the like, the first magnets 561 of the movable module 300 face the first coils 541, 542, 543 and 544 of the coil holding body 260 to structure the movable module drive mechanism 500. Further, the second magnets 562 of the movable module 300 face the second coils 551, 552, 553 and 554 of the coil holding body 260 to structure the movable module drive mechanism 500. The movable module drive mechanism 500 is structured so as to sandwich the movable module 300 on both sides in the "X"-axis direction and is structured so as to sandwich the movable module 300 on both sides in the "Y"-axis direction. Therefore, when energization control to the first coils 541 through 544 and the second coils 551 through 554 is performed on the basis of a detection result of the gyroscope 180, swing of the movable module 300 can be corrected.

A sensor flexible circuit board 410 and a drive flexible circuit board 420 are disposed on the opposite side to the object side in the optical unit 100 and the gyroscope 180 is mounted on the sensor flexible circuit board 410.

An external connection part 425 of the drive flexible circuit board 420 is electrically connected with the sensor flexible circuit board 410 and the drive flexible circuit board 420 is extended to an outer side of the optical unit 100. The drive flexible circuit board 420 is used for energization control to the first coils 541, 542, 543 and 544 and the second coils 551, 552, 553 and 554 from the outside.

Further, the drive flexible circuit board 420 is used for inputting and outputting a signal to and from the photographing unit 1 and a "Board-to-Board" type connector 900 is used for electrically connecting the drive flexible circuit board 420 with the photographing unit 1. Therefore, a connector member 910 is mounted on the drive flexible circuit board 420 and a connector member 920 is mounted on an end part on the opposite side to the object side of the photographing unit 1. The connector member 920 is connected with the connector member 910 to structure the connector 900.

(Manufacturing Method for Optical Unit 10)

FIG. 10(*a*) through 10(*d*) are explanatory views showing a manufacturing method for the optical unit 100 in accordance with the second embodiment of the present invention. In order to manufacture the optical unit 100 in this embodiment, first, as shown in FIGS. 10(*a*) and 10(*b*), in the first step, the module cover 310 is mounted on the fixed body 210 through the spring member 600. In this case, the support member 330 has been attached to an end part on the opposite side to the object side of the module cover 310. Further, the sensor flexible circuit board 410 and the drive flexible circuit board 420 are disposed on the opposite side to the object side of the module cover 310. In this state, the connector member 910 is located on an inner side of the opening part 310*c* on the opposite side to the object side of the module cover 310.

Next, in the second step, as shown in FIGS. 10(*c*) and 10(*d*), the photographing unit 1 is inserted on an inner side of the module cover 310 through the fixed body side opening part 210*a* and the module cover side opening part 310*a*. As a result, the connector member 920 provided in the photographing unit 1 is connected with the connector member 910 which is mounted on the drive flexible circuit board 420.

Next, in the third step, as shown in FIG. 7(*a*), the pressing member 350 is attached to an end part on the object side of the module cover 310 and the end part on the object side of the photographing unit 1 is pressed and supported by the pressing member 350.

(Principal Effects in this Embodiment)

As described above, in the optical unit 100 and its manufacturing method in this embodiment, the fixed body 210 is provided with the fixed body side opening part 210*a* which is opened on the object side (first direction side) and the module cover 390 is provided with the module cover side opening part 390*a* on the object side (first direction) at a position superposed on the fixed body side opening part 210*a*. Therefore, in the first step, the module cover 310 is mounted on the fixed body 210 through the spring member 600 and the movable module drive mechanism 500 is provided between the module cover 310 and the fixed body 210 and, after that, in the second step, the photographing unit 1 is inserted on the inner side of the module cover 310 through the fixed body side opening part 210*a* and the module cover side opening part 390*a*. Therefore, the photographing unit 1 can be manufactured in a separate step from a step in which the module cover 310, the spring member 600, the movable module drive mechanism 500 are attached to the fixed body 210. Accordingly, different from a case that inspection is performed after all the members have been assembled, inspection can be performed during manufacturing. Therefore, a loss caused by a defective product can be restrained.

Further, the support member 330 as a support part is provided on the opposite side to the object side (second direction side) of the module cover 310 and the pressing member 350 is provided on the object side (first direction side). Therefore, when the photographing unit 1 is inserted in the inside of the module cover 310, the end part on the opposite side (second direction side) to the object side of the photographing unit 1 is supported by the support member 330. Further, after the pressing member 350 is attached, the end part on the object side (first direction side) of the photographing unit 1 is supported by the pressing member 350. Therefore, different from a structure in which, after the photographing unit 1 is accommodated in the inside of the module cover 310, the photographing unit 1 is fixed to the inside of the module cover 310 by adhesion, welding or the like, assembling is easily performed and displacement of the optical axis "L" is hard to be occurred. Accordingly, the production efficiency and yield of the optical unit 100 can be improved.

In addition, after the photographing unit 1 is mounted, only the photographing unit 1 can be exchanged and, when the optical unit 100 is to be manufactured, the photographing unit 1 can be easily changed to another photographing unit 1.

Further, in this embodiment, the connector 900 (connector members 910 and 920) is disposed between the end part on the opposite side (second direction side) to the object side of the photographing unit 1 and the support member 330. Therefore, the photographing unit 1 and the drive flexible circuit board 420 are electrically connected with each other only by inserting the photographing unit 1 in the inside of the module cover 310.

Other Embodiments

In the embodiments described above, at least an embodiment of the present invention is applied to the optical unit 100 which is used in a cell phone with a camera. However, at least an embodiment of the present invention may be applied to an optical unit 100 which is used in a thin digital camera or the like. Further, in the embodiments described above, in addition to the lens 10 and the imaging element 155 in the photographing unit 1, the lens drive mechanism 5 for magnetically driving the movable body 3 including the lens 121 in the optical axis "L" direction is supported on the support body 2. However, at least an embodiment of the present invention may be applied to a fixed-focus type optical unit in which the lens drive mechanism 5 is not mounted on the photographing unit 1.

Further, in the embodiments described above, a movable module which is provided with a lens and an imaging element is described as a movable module. However, at least an embodiment of the present invention may be applied to an optical unit which is provided with at least a lens as a movable module. The optical unit includes, for example, a laser pointer, a portable projection display device or an on-vehicle projection display device and the like.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An optical unit with a shake correcting function comprising:
    a fixed body;
    an optical element unit which holds an optical element;
    a movable module which holds the optical element unit;
    a spring member through which the movable module is supported by the fixed body so as to be capable of displacing;
    a shake detection sensor which detects a shake of the movable module; and
    a movable module drive mechanism for a shake correction which is provided between the movable module and the fixed body and which generates a magnetic drive force for relatively displacing the movable module with respect to the fixed body so as to cancel the shake on a basis of a detection result of the shake detection sensor;
    wherein one side in an optical axis direction is a first direction side and the other side is a second direction side;
    wherein the fixed body is provided with a fixed body side opening part which is larger than an optical element unit holding the optical element on a first direction side; and
    wherein the movable module comprises:
        a module cover which is supported by the fixed body so as to be capable of displacing through the spring member and is provided with a module cover side opening part larger than the optical element unit;
        a support part which is provided in the module cover and supports an end part on the second direction side of the optical element unit;
        a pressing member which supports an end part on the first direction side of the optical element unit and is connected with the module cover; and
        wherein the fixed body is provided with a fixed body side opening part which is larger than the optical element unit at a position superposed on the module cover side opening part on the first direction side.

2. The optical unit according to claim 1, wherein the module cover is provided with a tube-like shape body part which surrounds the optical element unit and a support plate part which is protruded toward the module cover side opening part from an end part on the second direction side of the tube-like shape body part as the support part.

3. The optical unit according to claim 1, wherein
    the module cover is provided with a tube-like shape body part which surrounds the optical element unit, and
    the support part is a support member which is a separate member from the module cover and is provided on the second direction side with respect to the tube-like shape body part.

4. The optical unit according to claim 3, wherein the optical element unit holds a lens and an imaging element as the optical element.

5. The optical unit according to claim 4, wherein the optical element unit holds a lens drive mechanism for driving the lens in the optical axis direction.

6. The optical unit according to claim 5, wherein the shake detection sensor is provided at position which is not superposed on the optical element unit in the optical axis direction.

7. The optical unit according to claim 1, wherein
    the second direction side is a side to which an optical axis is extended from the optical element unit, and
    the first direction side is an opposite side to the second direction side.

8. The optical unit according to claim 7, wherein the shake detection sensor is provided at a position which is not superposed on the optical element unit in the optical axis direction.

9. The optical unit according to claim 8, wherein
    the first direction side is a side to which an optical axis is extended in the optical element unit, and
    the second direction side is an opposite side to the first direction side.

10. The optical unit according to claim 1, wherein
    the first direction side is a side to which an optical axis is extended from the optical element unit, and
    the second direction side is an opposite side to the first direction side.

11. The optical unit according to claim 10, wherein a connector member which is electrically connected with the optical element unit is disposed between the end part on the second direction side of the optical element unit and the support part.

12. The optical unit according to claim 10, wherein the optical element unit holds an imaging element as the optical element.

13. The optical unit according to claim 10, wherein the optical element unit holds an optical element drive mechanism for driving the optical element in the optical axis direction.

14. The optical unit according to claim 10, wherein
the module cover is provided with a tube-like shape body part which surrounds the optical element unit, and
the support part is a support member which is a separate member from the module cover and is provided on the second direction side with respect to the tube-like shape body part.

15. A manufacturing method for an optical unit with a shake correcting function, the optical unit including:
a fixed body;
an optical element unit which holds an optical element;
a movable module which holds the optical element unit;
a spring member through which the movable module is supported by the fixed body so as to be capable of displacing;
a shake detection sensor which detects a shake of the movable module; and
a movable module drive mechanism for a shake correction which is provided between the movable module and the fixed body and which generates a magnetic drive force for relatively displacing the movable module with respect to the fixed body so as to cancel the shake on a basis of a detection result of the shake detection sensor;
the manufacturing method comprising:
one side in an optical axis direction is a first direction side and the other side is a second direction side,
previously providing the fixed body with a fixed body side opening part which is larger than an optical element unit holding the optical element on a first direction side;
previously providing the movable module with:
a module cover which is to be supported by the fixed body so as to be capable of displacing through the spring member and is provided with a module cover side opening part larger than the optical element unit on the first direction side;
a support part which is provided in the module cover for supporting an end part on the second direction side of the optical element unit; and
a pressing member for supporting an end part on the first direction side of the optical element unit and for being connected with the module cover; and
previously providing the fixed body with a fixed body side opening part which is larger than the optical element unit at a position superposed on the module cover side opening part on the first direction side;
a first step in which the module cover and the support part are mounted on the fixed body through the spring member and the movable module drive mechanism is provided between the module cover and the fixed body;
a second step in which the optical element unit is inserted to an inner side of the module cover through the fixed body side opening part and the module cover side opening part; and
a third step in which the pressing member is connected with the module cover.

16. The manufacturing method for an optical unit according to claim 15, wherein
the first direction side is a side on an object to be photographed side, and
in the second step, the optical element unit is inserted to the inner side of the module cover from the object to be photographed side.

17. The manufacturing method for an optical unit according to claim 16, wherein
the module cover is provided with a tube-like shape body part which surrounds the optical element unit, and
the support part is a support member which is a separate member from the module cover and is provided on the second direction side which is an opposite side to the object to be photographed side with respect to the tube-like shape body part.

18. The manufacturing method for an optical unit according to claim 17, wherein the optical element unit holds a lens and an imaging element as the optical element, and holds a lens drive mechanism for driving the lens in the optical axis direction.

* * * * *